(12) United States Patent
Yim et al.

(10) Patent No.: US 11,325,327 B2
(45) Date of Patent: May 10, 2022

(54) BALL BAT WITH ONE-PIECE MULTI-WALL BARREL PORTION

(71) Applicant: WILSON SPORTING GOODS CO., Chicago, IL (US)

(72) Inventors: Jeremy H. Yim, Rocklin, CA (US); Carlos A. Sandoval, Citrus Heights, CA (US); Jusuf Musinovic, Rocklin, CA (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

(21) Appl. No.: 16/989,414

(22) Filed: Aug. 10, 2020

(65) Prior Publication Data

US 2022/0040939 A1 Feb. 10, 2022

(51) Int. Cl.
| | |
|---|---|
| *B29C 70/54* | (2006.01) |
| *A63B 59/50* | (2015.01) |
| *B29C 70/34* | (2006.01) |
| *B29C 70/06* | (2006.01) |
| *B29C 33/68* | (2006.01) |
| *B29K 105/08* | (2006.01) |
| *A63B 102/18* | (2015.01) |
| *B29L 31/52* | (2006.01) |

(52) U.S. Cl.
CPC .............. *B29C 70/54* (2013.01); *B29C 33/68* (2013.01); *B29C 70/06* (2013.01); *B29C 70/342* (2013.01); *B29C 70/345* (2013.01); *A63B 59/50* (2015.10); *A63B 2102/18* (2015.10); *A63B 2102/182* (2015.10); *A63B 2209/02* (2013.01); *B29K 2105/0872* (2013.01); *B29L 2031/52* (2013.01)

(58) Field of Classification Search
CPC ......... A63B 59/50; B29C 70/44; B29C 70/54; B29C 33/68
See application file for complete search history.

(56) References Cited

U.S. PATENT DOCUMENTS

| | | |
|---|---|---|
| 3,116,926 A | 1/1964 | Owen et al. |
| 3,392,976 A | 7/1968 | Hayes |
| 4,274,631 A | 6/1981 | Hayazaki |
| 4,848,745 A * | 7/1989 | Bohannan .............. A63B 60/00 473/119 |
| 4,898,386 A | 2/1990 | Anderson |

(Continued)

*Primary Examiner* — Matthew J Daniels
*Assistant Examiner* — Andrew D Graham
(74) *Attorney, Agent, or Firm* — Terence P. O'Brien

(57) ABSTRACT

A method of forming a barrel portion including obtaining a mandrel shaped to define at least an inner surface of a barrel portion of the bat, wrapping a first plurality of layers of fiber composite material about the mandrel, placing a removable material over a first portion of the first plurality of layers, and wrapping a second plurality of layers of fiber composite material over the removable material and the portion of the first plurality of layers not covered by the removable material for form an assembly. The method further includes separating the mandrel from the assembly, inserting an expandable member within the assembly, inserting the assembly into a barrel-forming mold, and molding the assembly in a single molding cycle, curing the first and second layers with the removable material to form the barrel portion of the bat, and removing the removable material and the member from the barrel portion.

25 Claims, 15 Drawing Sheets

(56) References Cited

U.S. PATENT DOCUMENTS

| | | | |
|---|---|---|---|
| 4,931,247 A * | 6/1990 | Yeh | B29C 53/566 |
| | | | 264/250 |
| 4,951,948 A | 8/1990 | Peng | |
| 5,080,363 A | 1/1992 | Soong | |
| 5,219,164 A | 6/1993 | Peng | |
| 5,301,940 A * | 4/1994 | Seki | B29C 70/085 |
| | | | 264/258 |
| 5,303,917 A | 4/1994 | Uke | |
| 5,415,398 A | 5/1995 | Eggiman | |
| 5,511,777 A | 4/1996 | McNeely | |
| 5,676,610 A * | 10/1997 | Bhatt | A63B 59/50 |
| | | | 473/566 |
| 5,722,908 A * | 3/1998 | Feeney | A63B 59/50 |
| | | | 473/567 |
| 5,899,823 A | 5/1999 | Eggiman | |
| 5,964,673 A | 10/1999 | MacKay, Jr. | |
| 6,042,493 A * | 3/2000 | Chauvin | A63B 59/51 |
| | | | 473/566 |
| 6,053,827 A | 4/2000 | MacKay, Jr. et al. | |
| 6,056,655 A * | 5/2000 | Feeney | A63B 59/51 |
| | | | 473/567 |
| 6,077,178 A | 6/2000 | Brandt | |
| 6,251,034 B1 * | 6/2001 | Eggiman | B29C 70/32 |
| | | | 473/567 |
| 6,352,485 B1 * | 3/2002 | Philpot | B29C 70/32 |
| | | | 473/564 |
| 6,352,662 B1 * | 3/2002 | Murphy | A63B 53/10 |
| | | | 425/389 |
| 6,425,836 B1 * | 7/2002 | Misono | A63B 59/54 |
| | | | 473/567 |
| 6,497,631 B1 | 12/2002 | Fritzke et al. | |
| 6,530,852 B2 | 3/2003 | Rios | |
| 6,533,985 B1 * | 3/2003 | Smith | B29C 43/12 |
| | | | 264/257 |
| 6,723,012 B1 * | 4/2004 | Sutherland | A63B 59/50 |
| | | | 473/567 |
| 6,733,404 B2 | 5/2004 | Fritzke et al. | |
| 6,767,299 B1 | 7/2004 | Chang | |
| 6,783,471 B2 | 8/2004 | Bolduc et al. | |
| 6,808,464 B1 * | 10/2004 | Nguyen | A63B 59/50 |
| | | | 473/566 |
| 6,875,137 B2 | 4/2005 | Forsythe et al. | |
| 6,905,429 B2 | 6/2005 | Forsythe et al. | |
| 6,949,038 B2 | 9/2005 | Fritzke | |
| 7,011,588 B2 | 3/2006 | Fritzke et al. | |
| 7,044,871 B2 | 5/2006 | Sutherland et al. | |
| 7,052,419 B2 | 5/2006 | Chang | |
| 7,140,988 B1 | 11/2006 | Hinman | |
| 7,166,046 B1 | 1/2007 | Liu | |
| 7,175,552 B2 | 2/2007 | Fritzke et al. | |
| 7,201,679 B2 | 4/2007 | Nguyen | |
| 7,267,619 B1 | 9/2007 | Pettis | |
| 7,399,242 B1 | 7/2008 | Smith | |
| 7,410,433 B2 * | 8/2008 | Guenther | A63B 60/46 |
| | | | 473/567 |
| 7,572,197 B2 | 8/2009 | Chauvin et al. | |
| 7,601,083 B1 | 10/2009 | Heald et al. | |
| 7,749,115 B1 | 7/2010 | Cruz et al. | |
| 7,867,114 B2 | 1/2011 | Sutherland | |
| 7,955,200 B1 | 6/2011 | Cruz et al. | |
| 7,980,970 B2 | 7/2011 | Watari et al. | |
| 8,206,250 B1 | 6/2012 | Cruz et al. | |
| 8,226,505 B2 | 7/2012 | Burger | |
| 8,317,640 B1 | 11/2012 | Cruz et al. | |
| 8,512,176 B1 | 8/2013 | Mathew et al. | |
| 8,632,428 B2 | 1/2014 | Burger | |
| 8,852,037 B2 * | 10/2014 | Epling | A63B 60/08 |
| | | | 473/567 |
| 9,005,056 B2 | 4/2015 | Pegnatori | |
| 9,067,109 B2 | 6/2015 | Epling et al. | |
| 9,149,697 B2 | 10/2015 | Epling et al. | |
| 9,242,155 B1 | 1/2016 | Lindsay et al. | |
| 9,242,156 B2 * | 1/2016 | Goodwin | A63B 60/42 |
| 9,504,891 B1 * | 11/2016 | Chen | A63B 59/54 |
| 9,511,267 B2 * | 12/2016 | Thurman | A63B 59/54 |
| 9,731,179 B2 * | 8/2017 | Thurman | A63B 60/42 |
| 9,731,180 B2 | 8/2017 | Goodwin et al. | |
| 9,802,094 B2 | 10/2017 | Goodwin et al. | |
| 9,814,956 B2 | 11/2017 | Burger et al. | |
| 9,956,464 B2 * | 5/2018 | Moritz | A63B 59/50 |
| 10,220,277 B1 * | 3/2019 | Hunt | A63B 60/00 |
| 10,369,442 B1 | 8/2019 | Stenzler et al. | |
| 10,387,930 B2 | 8/2019 | Thurman et al. | |
| 10,398,955 B2 | 9/2019 | Stenzler et al. | |
| 10,456,640 B2 * | 10/2019 | Rouzier | A63B 60/52 |
| 10,507,367 B2 | 12/2019 | Gray et al. | |
| 10,561,913 B2 | 2/2020 | Burger et al. | |
| 10,646,761 B2 | 5/2020 | Earley et al. | |
| 10,773,138 B2 | 9/2020 | Epling et al. | |
| 10,987,556 B2 | 4/2021 | Gray et al. | |
| 11,058,934 B2 | 7/2021 | Goodwin et al. | |
| 2002/0091022 A1 * | 7/2002 | Fritzke | A63B 59/51 |
| | | | 473/566 |
| 2002/0094892 A1 | 7/2002 | Chauvin et al. | |
| 2003/0013563 A1 | 1/2003 | Ryan | |
| 2003/0153416 A1 * | 8/2003 | Anderson | A63B 59/50 |
| | | | 473/566 |
| 2003/0186763 A1 * | 10/2003 | Eggiman | A63B 59/58 |
| | | | 473/564 |
| 2003/0196716 A1 * | 10/2003 | Lindsay | B32B 3/266 |
| | | | 138/177 |
| 2004/0043846 A1 | 3/2004 | Haynes | |
| 2004/0132564 A1 * | 7/2004 | Giannetti | A63B 59/54 |
| | | | 473/567 |
| 2004/0176197 A1 * | 9/2004 | Sutherland | A63B 59/51 |
| | | | 473/564 |
| 2004/0198539 A1 * | 10/2004 | Sutherland | A63B 60/08 |
| | | | 473/567 |
| 2004/0209716 A1 * | 10/2004 | Vacek | A63B 59/54 |
| | | | 473/567 |
| 2005/0003913 A1 * | 1/2005 | Guenther | A63B 59/50 |
| | | | 473/564 |
| 2005/0070384 A1 * | 3/2005 | Fitzgerald | A63B 59/50 |
| | | | 473/567 |
| 2005/0143203 A1 | 6/2005 | Souders et al. | |
| 2005/0176531 A1 * | 8/2005 | Fitzgerald | A63B 60/16 |
| | | | 473/564 |
| 2006/0252586 A1 | 11/2006 | Nguyen | |
| 2007/0142135 A1 | 6/2007 | Cheng | |
| 2007/0155546 A1 | 7/2007 | Chauvin et al. | |
| 2007/0254752 A1 * | 11/2007 | Sutherland | A63B 60/54 |
| | | | 473/564 |
| 2008/0234076 A1 | 9/2008 | Bhatt | |
| 2008/0261014 A1 * | 10/2008 | McGuire | B29C 51/28 |
| | | | 428/297.1 |
| 2009/0174114 A1 * | 7/2009 | Chen | A63B 59/50 |
| | | | 264/263 |
| 2009/0215559 A1 * | 8/2009 | McNamee | A63B 59/50 |
| | | | 473/567 |
| 2009/0215560 A1 * | 8/2009 | McNamee | A63B 60/06 |
| | | | 473/567 |
| 2009/0264230 A1 * | 10/2009 | Thouin | A63B 59/50 |
| | | | 473/567 |
| 2009/0280934 A1 | 11/2009 | Watari et al. | |
| 2009/0280935 A1 | 11/2009 | Watari et al. | |
| 2010/0029418 A1 | 2/2010 | Chen | |
| 2010/0125014 A1 | 5/2010 | Watari | |
| 2010/0160095 A1 * | 6/2010 | Chauvin | A63B 60/08 |
| | | | 473/564 |
| 2011/0111892 A1 | 5/2011 | Thouin et al. | |
| 2011/0111894 A1 | 5/2011 | Thouin | |
| 2011/0152015 A1 | 6/2011 | Burger | |
| 2011/0172038 A1 | 7/2011 | Watari et al. | |
| 2012/0108371 A1 * | 5/2012 | Epling | A63B 59/50 |
| | | | 473/566 |
| 2012/0178557 A1 * | 7/2012 | Tsukamoto | A63B 59/54 |
| | | | 473/564 |
| 2013/0288830 A1 * | 10/2013 | Kreindler | B29C 70/86 |
| | | | 473/564 |
| 2013/0316859 A1 * | 11/2013 | Burger | A63B 59/50 |
| | | | 473/564 |

(56) References Cited

U.S. PATENT DOCUMENTS

| | | | |
|---|---|---|---|
| 2014/0080642 A1* | 3/2014 | Epling | A63B 59/50 |
| | | | 473/564 |
| 2014/0206483 A1 | 7/2014 | Goodwin et al. | |
| 2014/0274491 A1 | 9/2014 | Long et al. | |
| 2014/0274492 A1 | 9/2014 | Kennedy | |
| 2014/0274493 A1 | 9/2014 | Heussner | |
| 2015/0018138 A1* | 1/2015 | Slater | A63B 60/08 |
| | | | 473/567 |
| 2015/0018139 A1* | 1/2015 | Slater | A63B 59/54 |
| | | | 473/567 |
| 2015/0157908 A1* | 6/2015 | Van Nguyen | A63B 59/51 |
| | | | 473/564 |
| 2015/0273295 A1 | 10/2015 | Haas et al. | |
| 2016/0193793 A1* | 7/2016 | Filippini | B32B 3/26 |
| | | | 428/71 |
| 2017/0056736 A1* | 3/2017 | Fitzgerald | B29D 23/00 |
| 2017/0080307 A1* | 3/2017 | Chang | B29C 70/22 |
| 2017/0340935 A1* | 11/2017 | Gray | A63B 59/50 |
| 2018/0065011 A1* | 3/2018 | Earley | A63B 59/00 |
| 2018/0093148 A1* | 4/2018 | Tsukamoto | A63B 59/56 |
| 2018/0221735 A1* | 8/2018 | Burger | A63B 60/02 |
| 2019/0054357 A1* | 2/2019 | Epling | A63B 59/50 |
| 2019/0344140 A1* | 11/2019 | Chauvin | A63B 60/00 |
| 2019/0381377 A1* | 12/2019 | Chauvin | A63B 60/08 |
| 2020/0391449 A1* | 12/2020 | Tudor | B29C 70/34 |

* cited by examiner

BALL BAT WITH ONE-PIECE MULTI-WALL BARREL PORTION

BACKGROUND

Baseball and softball bats are well known sporting goods. The materials used to form bats have changed and become more varied overtime, including materials such as wood, aluminum, other alloys, fiber composite materials and combinations thereof. Additionally, the construction of ball bats has also evolved and become more varied overtime. The cost of many existing bat constructions can be very high due to the complexity of the construction, the cost of the materials, and the time required to produce the finished ball bat.

Accordingly, a need exists for bat configurations that provide exceptional performance, durability and reliability characteristics without excessive material and/or manufacturing costs. It would be desirable to provide a bat construction and method of manufacturing that is cost effective, allows for shorter production lead times and exceptional performance. A need exists for a ball bat that provides exceptional feel to the player, even upon off center impacts with the ball.

SUMMARY OF THE INVENTION

The present invention provides a ball bat extending along a longitudinal axis and configured for impacting a ball. The bat includes a barrel portion, an end cap and a handle portion. The barrel portion includes a proximal region having a continuous single wall construction, a central region and a distal region. The central region includes at least first and second central region walls longitudinally extending from the proximal region, and a distal region including first and second distal region walls longitudinally extending from the central region. The first and second central region walls and the first and second distal region walls form a first inner barrel wall and an outer barrel wall, respectively. The first inner barrel wall and the outer barrel wall are spaced apart by a first separation. The first separation is unfilled and longitudinally extends over the entire length of the first distal region wall and at least a portion of the length of the central region. An end cap is coupled to the distal region of the barrel portion. A handle portion is coupled to the proximal region of the barrel portion.

According to a principal aspect of a preferred form of the invention, a method of forming a ball bat extending along a longitudinal axis and configured for impacting a ball is provided. The method includes obtaining a mandrel shaped to define at least an inner surface of a barrel portion of the bat, and wrapping a first plurality of layers of fiber composite material about the mandrel. The first plurality of layers of fiber composite material is initially uncured. The mandrel extends along the longitudinal axis. The first plurality of layers wrapped about the mandrel have a first longitudinal dimension. The method further includes placing a removable material over a first portion of the first plurality of layers. The first portion of the first plurality of layers covered by the removable material has a second longitudinal dimension that is less than the first longitudinal dimension. The method further includes wrapping a second plurality of layers of fiber composite material over the removable material covering the first portion of the first plurality of layers and over at least a second portion of the first plurality of fibers. The second portion of the first plurality of fibers is uncovered by the removable material. The second plurality of layers of fiber composite material is initially uncured. The first and second plurality of layers and the removable material form a pre-molded barrel portion lay-up. The method further includes separating the mandrel from the pre-molded barrel portion lay-up, inserting an expandable member within the pre-molded barrel portion lay-up, inserting the pre-molded barrel portion lay-up into a barrel-forming mold, and molding the first and second pluralities of layers together with the removable material in a single molding cycle. The method then provides for curing the first and second pluralities of layers with the removable material to form at least the barrel portion of the bat, and removing the removable material and the expandable member from the barrel portion, This invention will become more fully understood from the following detailed description, taken in conjunction with the accompanying drawings described herein below, and wherein like reference numerals refer to like parts.

Figure 1:
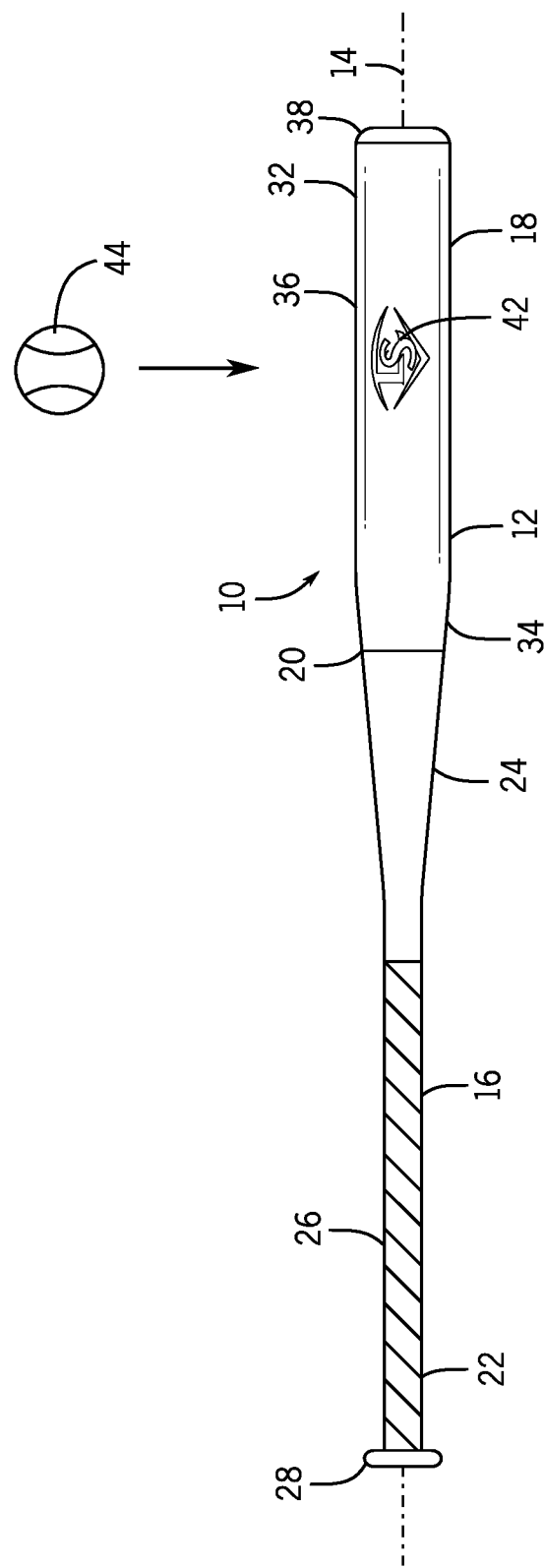
FIG. 1 is a side view of an example ball bat having a barrel portion coupled to a handle portion.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

FIG. 1 illustrates a ball bat generally indicated at 10. The ball bat 10 of FIG. 1 is configured as a baseball bat; however, the ball bat 10 can also be formed as a fastpitch softball bat, a slow pitch softball bat, a rubber ball bat, or other form of ball bat. The bat 10 includes a tubular frame 12 extending along a longitudinal axis 14. The frame 12 can be sized in a variety of different weights, lengths and diameters to meet such needs of a specific player. For example, the weight of the frame 12 can be formed within the range of 15 ounces to 36 ounces, the length of the frame can be formed within the range of 24 to 36 inches, and the maximum diameter of the barrel 18 can range from 1.5 to 3.5 inches.

The frame 12 has a relatively small diameter handle portion 16, a relatively larger diameter barrel portion 18 (also referred as a hitting or impact portion), and an intermediate tapered region 20. The intermediate tapered region 20 can be formed by the handle portion 16, the barrel portion 18 or a combination thereof. In one implementation, the handle and barrel portions 16 and 18 of the frame 12 can be formed as separate structures, which are connected or coupled together. For purposes of this disclosure, the term "coupled" means directly or indirectly connected. For example, a handle portion can be integrally formed to a barrel portion, or the handle portion can be separated from the barrel portion by one or more intermediate components. In each example, the handle portion is coupled to the barrel. In the context of railroad cars, a caboose of a train can be directly connected to an engine of the train. Alternatively, one or more railroad cars can be positioned between the engine and the caboose. In each case, whether directly connected or separated by one or more railroad cars, the caboose is coupled to the engine.

Figure 12:
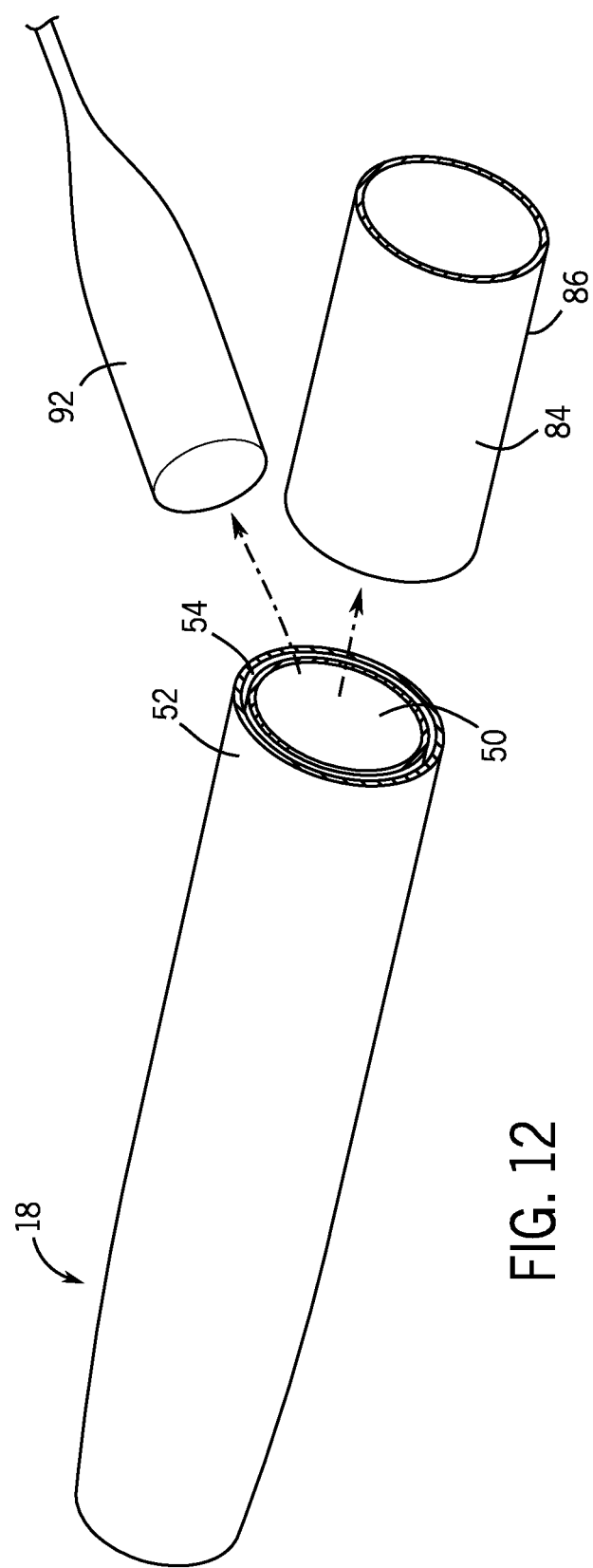

A multi-piece frame construction enables the handle portion 16 to be formed of one material, and the barrel portion 18 to be formed of a second, different material (or two or more different materials). In other implementations, such as shown in FIG. 12, the bat can be formed with a one-piece frame in which the handle portion, the intermediate tapered region and the barrel portion are one integral piece and the portions cannot be separated without destroying the frame.

Referring to FIG. 1, the handle portion 16 is an elongate structure having a proximal end region 22 and a distal end region 24, which extends along, and diverges outwardly from, the axis 14 to form a substantially frusto-conical shape for connecting or coupling to the barrel portion 18. Preferably, the handle portion 16 is sized for gripping by the user and includes a grip 26, which is wrapped around and extends longitudinally along the handle portion 16, and a knob 28 connected to the proximal end 22 of the handle portion 16. The handle portion 16 is formed of a strong, generally flexible, lightweight material, preferably a fiber composite material. Alternatively, the handle portion 16 can be formed of other materials such as an aluminum alloy, a titanium alloy, steel, other alloys, a thermoplastic material, a thermoset material, wood or combinations thereof.

Referring to FIGS. 1 and 2, the barrel portion 18 of the frame 12 is "tubular," "generally tubular," or "substantially tubular," each of these terms is intended to encompass softball style bats having a substantially cylindrical impact (or "barrel") portion as well as baseball style bats having barrel portions with generally frusto-conical characteristics in some locations. The barrel portion 18 extends along the axis 14 and has an inner surface 30, an outer surface 40, a distal end region 32, a proximal end region 34, and a central region 36 disposed between the distal and proximal end regions 32 and 34. The proximal end region 34 converges toward the axis 14 in a direction toward the proximal end of the barrel portion 18 to form a frusto-conical shape that is complementary to the shape of the distal end region 24 of the handle portion 16. The barrel portion 18 can be directly connected to the handle portion 16. The connection can involve a portion, or substantially all, of the distal end region 24 or tapered region 20 of the handle portion 16 and the proximal end region 34 of the barrel portion 18. In another implementation, the handle portion 16 can be a tubular body having a generally uniform diameter along its length and an intermediate member can be fixedly attached to the distal end region 24 for coupling the handle portion 16 to the barrel portion 18. The intermediate member can be used to space apart and/or attach the handle portion 16 to the barrel portion 18. The intermediate member can space apart all or a portion of the barrel portion 16 from the handle portion 16, and it can be formed of an elastomeric material, an epoxy, an adhesive, a plastic or any conventional spacer material. The bat 10 further includes an end cap 38 attached to the distal end 32 of the barrel portion 18 to substantially enclose the distal end 32.

The handle and barrel portions 16 and 18 can be coated and/or painted with one or more layers of paint, clear coat, inks, coatings, primers, and other conventional outer surface coatings. The outer surface 40 of the barrel portion 18 and/or the handle portion 16 can also include alpha numeric and/or graphical indicia 42 indicative of designs, trademarks, graphics, specifications, certifications, instructions, warnings and/or markings. The indicia 42 can be a trademark that is applied as a decal, as a screening or through other conventional means.

Figure 2A:
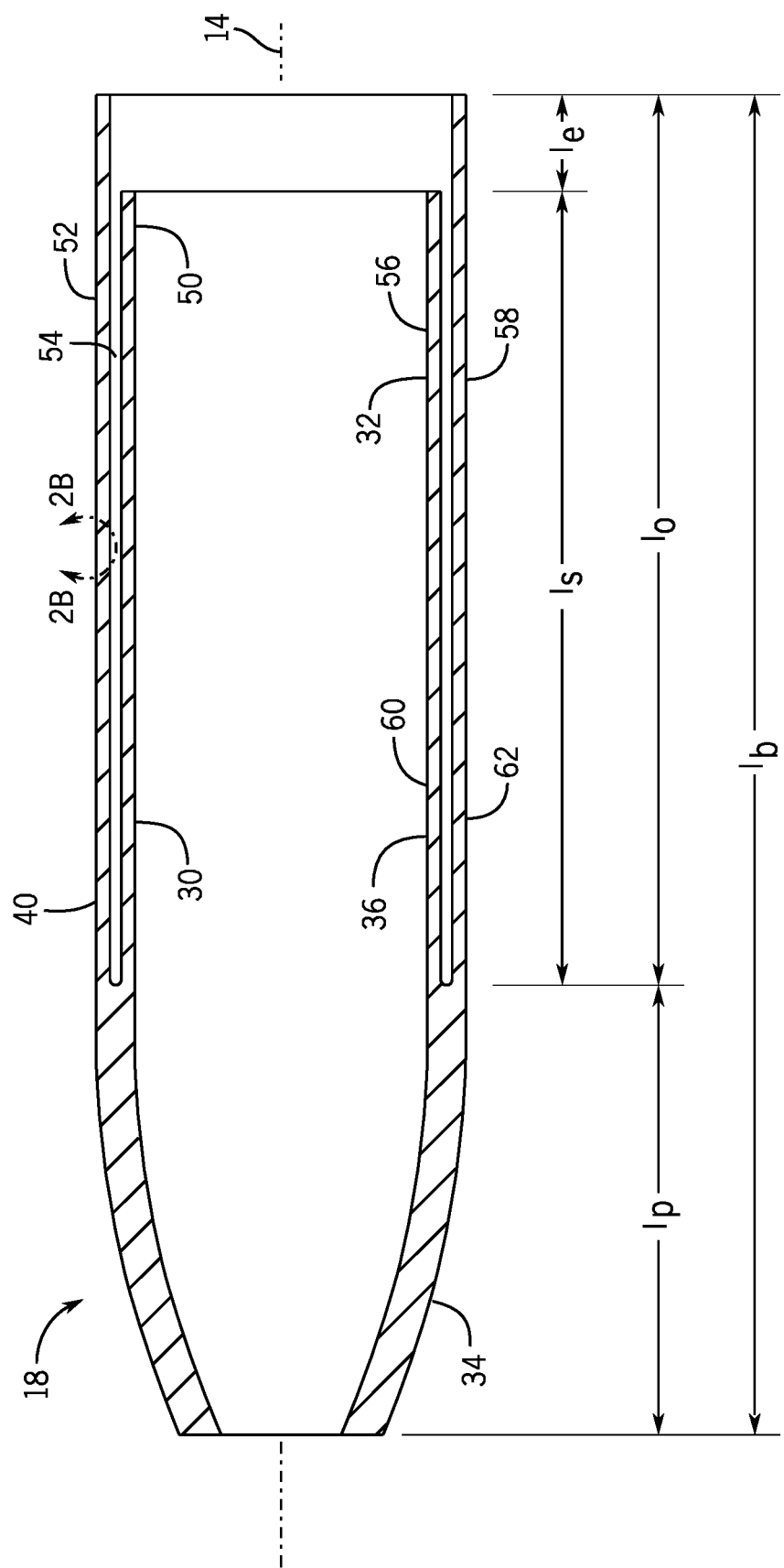
FIG. 2A is a longitudinal cross-sectional view of a barrel portion of the bat of FIG. 1.

Referring to FIG. 2A, the barrel portion 18 is formed of a fiber composite material and has a double wall construction extending along the central region 36 and the distal region 32. The barrel portion 18 has a barrel portion length $l_b$. The double wall construction results from the barrel portion 18 being formed with inner and outer barrel walls 50 and 52 that are spaced apart by a longitudinally extending first separation 54. In one implementation, as shown in FIG. 2A, the first separation 54 extends along the central region 36 and the distal region 32. The inner and outer barrel walls 50 and 52 can include inner and outer distal region walls 56 and 58 and inner and outer central region walls 60 and 62 depending upon the length of the first separation. A first separation length, ls, extends from a distal end of the inner distal region wall 56 or the inner barrel wall 50 toward a proximal end 34 of the barrel portion 18. The first separation length ls can be varied as desired. In one implementation, the first separation 54 is unfilled along the first separation length ls. Therefore, no separate material is positioned within the first separation 54, such as one or more release layers, for example. The first separation 54 is an unfilled space. In one implementation, the first separation length ls may extend only along the length of the inner distal region wall 56 to form the inner and outer distal region walls 56 and 58. In another implementation, the first separation length ls can extend the length of the inner distal region wall and into at least a portion of the central region 36 to form the inner and outer central region walls 60 and 62. In another implementation, the first separation length ls can extend along the entire length of the inner distal region wall 56 and the central region 36. In another implementation, the first separation length ls can extend along the entire inner distal region wall 56, the entire central region 36 and partially into the proximal region 34. The first separation length ls can extend over at least 25 percent of the barrel portion length $l_b$. In another implementation, the first separation length ls can extend over at least 40 percent of the barrel portion length $l_b$. In another implementation, the first separation length ls can extend over at least 60 percent of the barrel portion length $l_b$. In still another implementation, the first separation length ls can extend over at least 70 percent of the barrel portion length $l_b$.

In one implementation, the inner and outer distal region walls 56 and 58 can have the same length. In other implementations, the length of the inner distal region wall 56 may be less than the length of the outer distal region wall 58 so as to define an extension length le. The extension length le is the longitudinal dimension that the outer distal region wall 58 extends beyond the inner distal region wall 56, and can provide additional space for receiving the end cap 38 within the distal region 32 of the bat 10. In one implementation, the extension length le is within the range of 0.2 inch to 4.0 inches. In another implementation, the extension length le is within the range of 0.2 to 1.0 inch.

An outer barrel wall length lo can extend from a distal end of the barrel portion 18 to the proximal end of the first separation 54. The proximal region 34 can have a proximal region length lp. Accordingly, the barrel portion length $l_b$ is the sum of the proximal region length lp and the outer barrel wall length lo. In one implementation, the proximal region length lp can be within the range of 1 inch between 1 to 7 inches. In other implementations, the proximal region length can be greater than 7 inches.

The barrel portion 18 including the proximal region 34, and the inner and outer barrel walls 50 and 52 is a single continuous integral structure formed of a fiber composite material following a single molding cycle described in more detail below. In one implementation, the first separation 54 has a substantially uniform radial dimension, measured radially from the longitudinal axis 14, within the range of 0.010 to 0.150 inch along the first separation length ls. In another implementation, the first separation 54 has a substantially uniform radial dimension within the range of 0.030 to 0.110 inch along the first separation length ls. In another implementation, the radial dimension of the first separation 54 can vary along the first separation length ls. In one implementation, the inner and outer barrel walls 50 and 52 each have inner and outer barrel wall thicknesses measured radially from the longitudinal axis 14 within the range of 0.030 to 0.200 inch. In one implementation, the inner barrel wall thickness of the inner barrel wall 50 measured radially from the longitudinal axis 14 can be within the range of 0.040 to 0.130 inch. In one implementation, the outer barrel wall thickness of the outer barrel wall 52 measured radially from the longitudinal axis 14 can be within the range of 0.040 to 0.130 inch.

Figure 8:
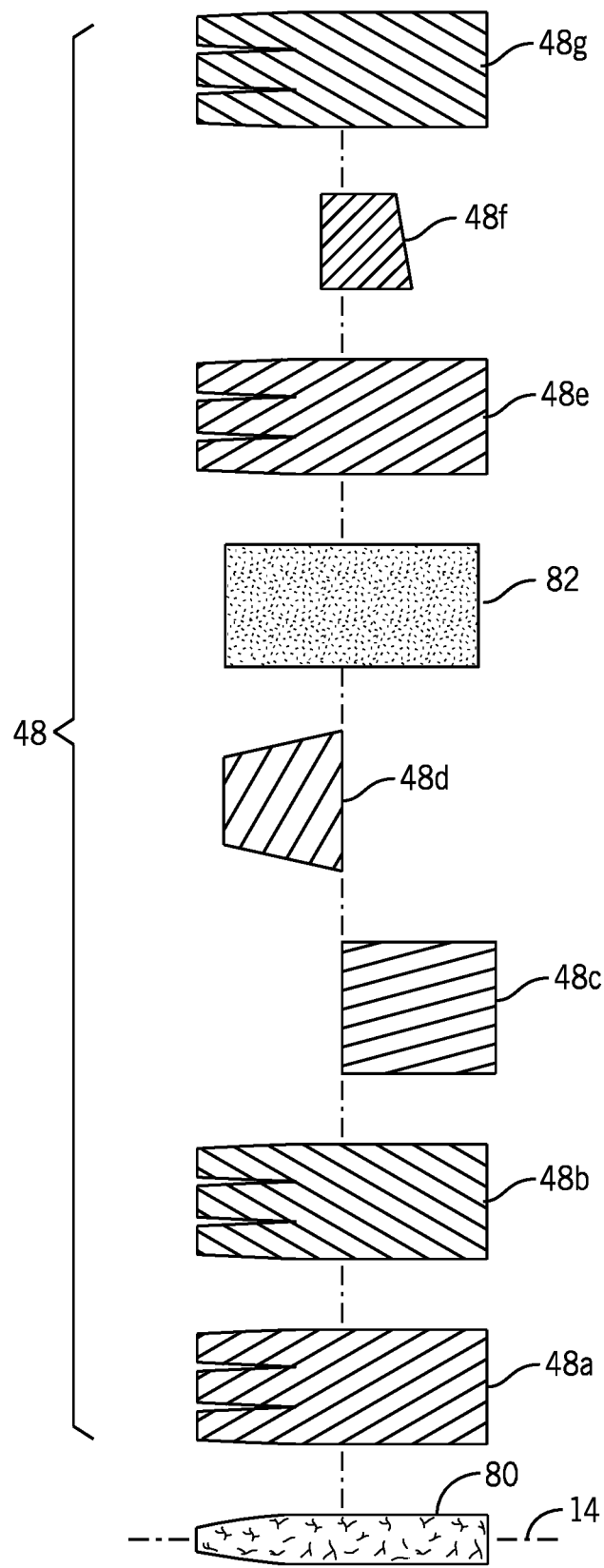
FIGS. 8 through 12 illustrate a method for the laying up of a barrel portion of the bat of FIG. 1 formed of fiber composite material, and molding and curing of the barrel portion.

The barrel portion 18 is preferably formed of strong, durable and resilient material, such as, a fiber composite material. In alternative preferred embodiments, the barrel portion 18 can be formed of one or more fiber composite materials in combination with one or more of an aluminum alloy, a titanium alloy, a scandium alloy, steel, other alloys, a thermoplastic material, a thermoset material, and/or wood. In one implementation, the barrel portion 18 can be formed of a fiber composite material having wall thickness of at least 0.060 inch. As used herein, the terms "composite material" or "fiber composite material" refer to a plurality of fibers impregnated (or permeated throughout) with a resin. The fibers can be co-axially aligned in sheets or layers, braided or weaved in sheets or layers, and/or chopped and randomly dispersed in one or more layers. The composite material may be formed of a single layer or multiple layers comprising a matrix of fibers impregnated with resin. The number layers can range from 3 to 48. In other implementations, the number of layers can be greater than 48. In multiple layer constructions, the fibers can be aligned in different directions (or angles) with respect to an axis including 0 degrees, 90 degrees and angular positions between 0 to 90 degrees, and/or in braids or weaves from layer to layer. In some implementations, the layers may be separated at least partially by one or more release layers 82 (FIG. 8). When used, the release layer will generally separate two adjacent layers and inhibit resin flow between layers during curing. The one or more release layers can also be used to reduce shear stress between layers of the composite material. The release layer can be formed of a polyethylene, other polymeric material, glass, nylon. In one particular embodiment, the release layer can be used to enable sliding or independent movement between layers of the composite material upon impact with a ball, such as a baseball 44 (see FIG. 1). The fibers are formed of a high tensile strength material such as graphite. Alternatively, the fibers can be formed of other materials such as, for example, glass, carbon, boron, basalt, carrot, Kevlar®, Spectra®, poly-para-phenylene-2, 6-benzobisoxazole (PBO), hemp and combinations thereof. In one set of example embodiments, the resin is preferably a thermosetting resin such as epoxy or polyester resins. In other sets of example embodiments, the resin can be a thermoplastic resin. The composite material is typically wrapped about a mandrel and/or a comparable structure, and cured under heat and/or pressure. While curing, the resin is configured to flow and fully disperse and impregnate the matrix of fibers.

Figure 2B:
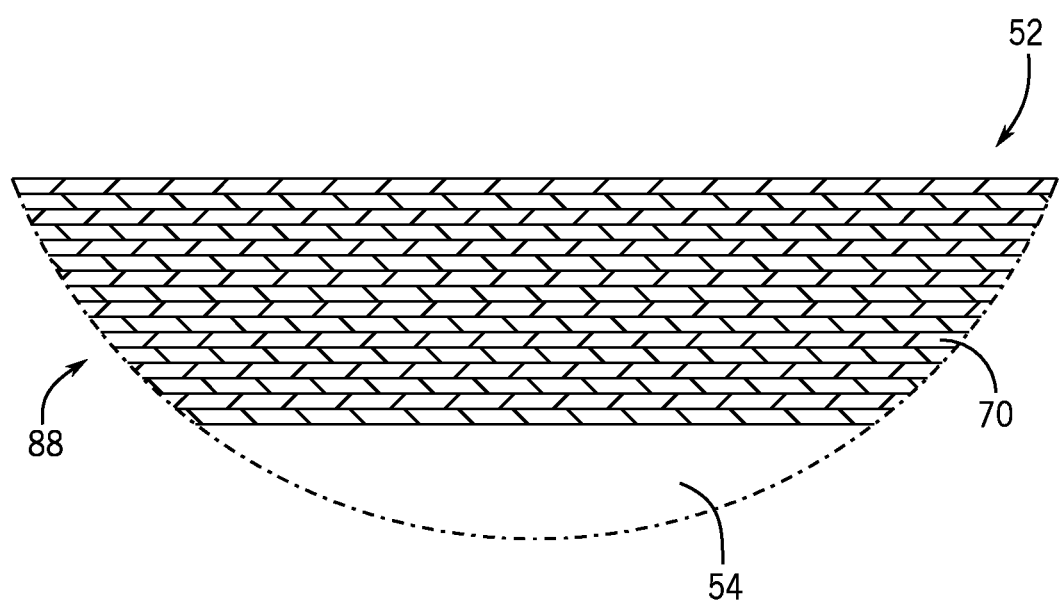
FIG. 2B is an enlarged cross-sectional view of a portion of an outer barrel wall of the barrel portion of FIG. 2A.

Referring to FIGS. 2A and 2B, a fiber composite material is preferably used to form the barrel portion 18. As used herein, the terms "composite material" or "fiber composite material" refer to a matrix or a series of plies 70 (also referred to as sheets or layers) of fiber bundles impregnated (or permeated throughout) with a resin. The fiber bundles can be co-axially bundled and aligned in the plies 70. A single ply 70 typically includes hundreds or thousands of fiber bundles that are initially arranged to extend coaxially and parallel with each other through the resin that is initially uncured. Each of the fiber bundles includes a plurality of fibers. The resin can be formed of the same material from one ply to another ply. Alternatively, each ply can use a different resin formulation. The plies 70 preferably typically have a thickness within the range of 0.002 to 0.015 inch. In a particularly preferred embodiment, the ply 70 can have a thickness within the range of 0.005 to 0.006 in. In other alternative preferred embodiments, other thickness ranges can also be used. The fibers or fiber bundles are preferably formed such that they extend along the ply or layer 70 and form generally the same angle with respect to an axis. The plies or layers 70 are typically identified, at least in part, by the size and polarity of the angle defined by the fibers or fiber bundles with respect to the axis. Examples of such descriptions of the plies 70 can be fibers or fiber bundles defining a positive 30 degree angle, a negative 30 degree angle, a positive 45 degree angle, a negative 45 degree angle, a positive 60 degree angle, a negative 60 degree angle, a positive 70 degree angle, a negative 70 degree angle, a positive 80 degree angle, a negative 80 degree angle, a 90 degree angle (extending perpendicular to the axis), and a 0 degree angle (or extending parallel to the axis). Other positive or negative angles can also be used. Accordingly, in the present application, a single ply or layer 70 refers to a single layer of fiber composite material in which the fiber bundles extend in substantially the same direction with respect to a longitudinal axis along the single layer, such as plus or positive 45 degrees or minus or negative 60 degrees.

Figure 3:
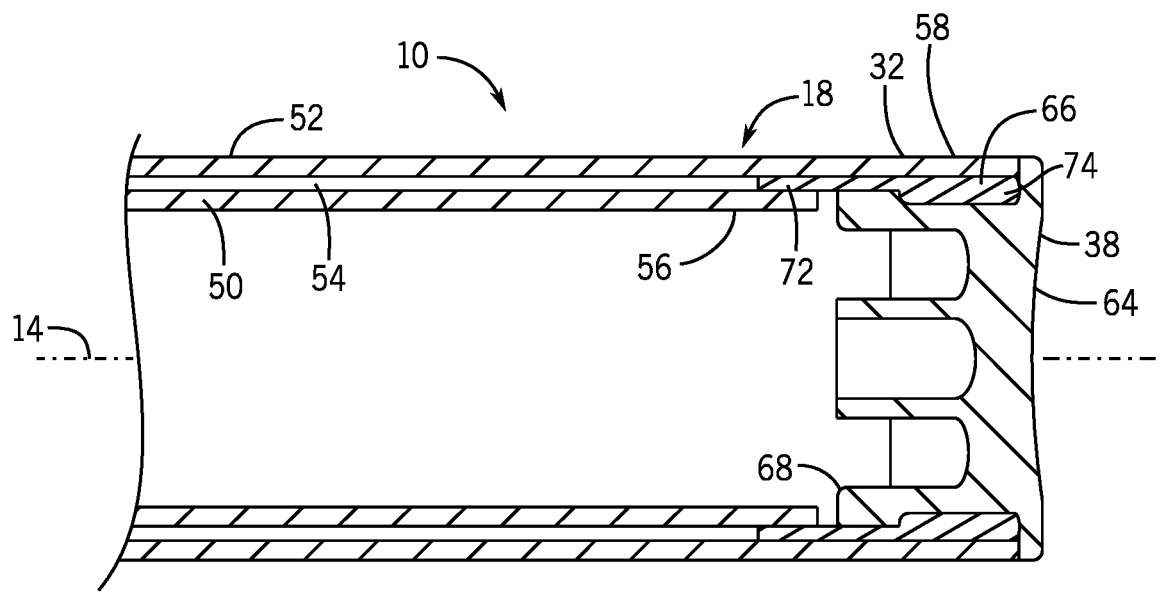
FIG. 3 is a longitudinal sectional view of a distal region of the ball bat of FIG. 1 in accordance with one implementation of the present invention.

Referring to FIG. 3, one implementation of the present invention illustrated. The barrel portion 18 including the inner and outer barrel walls 50 and 52 is formed of fiber composite material from a single molding cycle with the first separation 54 radially spacing apart the inner and outer barrel walls 50 and 52. The end cap 38 is coupled to the distal region 32 of the barrel portion 18. In the implementation of FIG. 3, a shim 66 or a spacing element is used to couple the inner and outer distal region barrel walls 56 and 58 to the end cap 38. The end cap 38 substantially encloses the distal end of the barrel portion 32 and includes a head region 64 and generally cylindrically shaped body 68 extending from the head region 64. The shim 66 includes proximal and distal regions 72 and 74. The distal region 74 of the shim 66 extends between the body 68 of the end cap 38 and an inner surface of the outer distal region wall 58, and proximal region 72 of the shim 66 extends between the inner and outer distal region walls 56 and 58. The distal region 74 of the shim 66 can be enlarged to mechanically engage the outer circumferential surface of the body 68 of the end cap 38. The distal region 74 of the shim 66 can be fixedly secured to one or both of the inner surface of the distal outer barrel wall 32 and/or the body 68 of the end cap 38 by an adhesive, such as epoxy. In other implementations, other forms of adhesives can be used. The proximal region 72 of the shim 66 can extend beyond the body 68 of the end cap 38 to fill a distal end of the first separation 54. The inner distal region wall 56 is longitudinally spaced apart from the end cap 38 such that the inner barrel wall does not contact the end cap 38. In one implementation, the proximal region 72 of the shim 66 can be positioned within the distal end of the first separation 54 but not bonded to or fixedly connected to the inner distal region wall 56 or to the outer barrel wall 58. As such, the inner distal region wall 56 is essentially cantilevered from the proximal region 34 of the barrel portion 18 and forms a free boundary condition for the inner distal region wall 56. In another implementation, the proximal region 72 of the shim 66 may be fixedly secured to the inner and/or outer distal region walls 56 and 58 through a press-fit connection, an adhesive and/or other fastening means.

Figure 4:
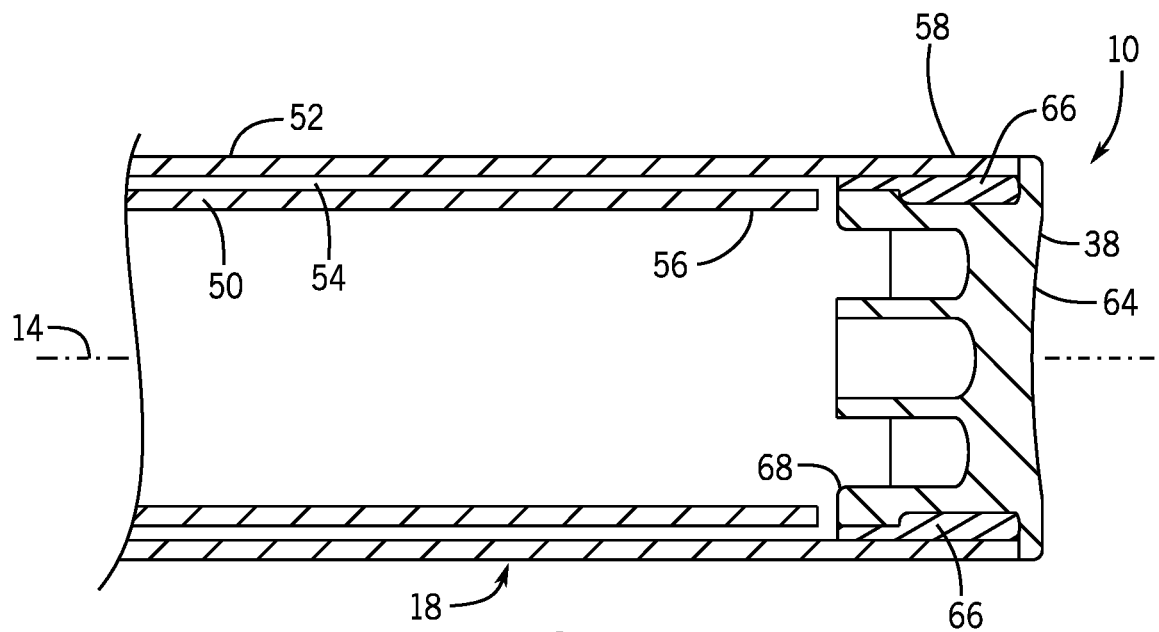
FIG. 4 is a longitudinal sectional view of a distal region of the ball bat of FIG. 1 in accordance with another implementation of the present invention.

Referring to FIG. 4, another implementation of the present invention is illustrated. The shim 66 can be sized to engage the body 68 of the end cap 38 but not to include the proximal region 72. Therefore, the shim 66 does not extend to the inner distal region wall 56. In this implementation, the inner barrel wall 50 is cantilevered from the proximal region 34 of the barrel portion 18 and is longitudinally spaced apart from the end cap 38 and the shim 66, and is radially spaced apart from the outer barrel wall 52. Accordingly, a free boundary condition is formed at the inner distal region wall 56 with respect to the outer barrel wall and with respect to the end cap 38.

Figure 5:
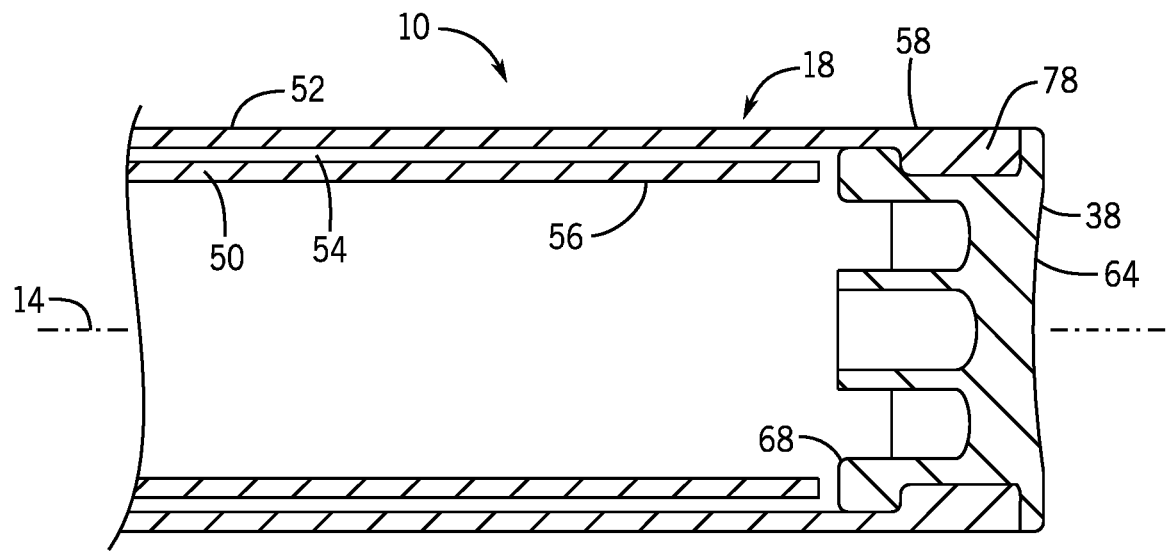
FIG. 5 is a longitudinal sectional view of a distal region of the ball bat of FIG. 1 in accordance with another implementation of the present invention.

Referring to FIG. 5, in another implementation of the present invention, the end cap 38 can be coupled to the distal region 32 of the barrel portion 18 without the use of the shim 66. Instead, a distal end 78 of the outer distal region wall 58 can be formed with a larger thickness for mechanically engaging the body 68 of the end cap 38. Like FIG. 4, in this implementation, the inner barrel wall 50 is cantilevered from the proximal region 34 of the barrel portion 18 and is longitudinally spaced apart from the end cap 38, and is radially spaced apart from the outer barrel wall 52. Accordingly, a free boundary condition is formed at the inner distal region wall 56 with respect to the outer barrel wall and with respect to the end cap 38.

Figure 6:
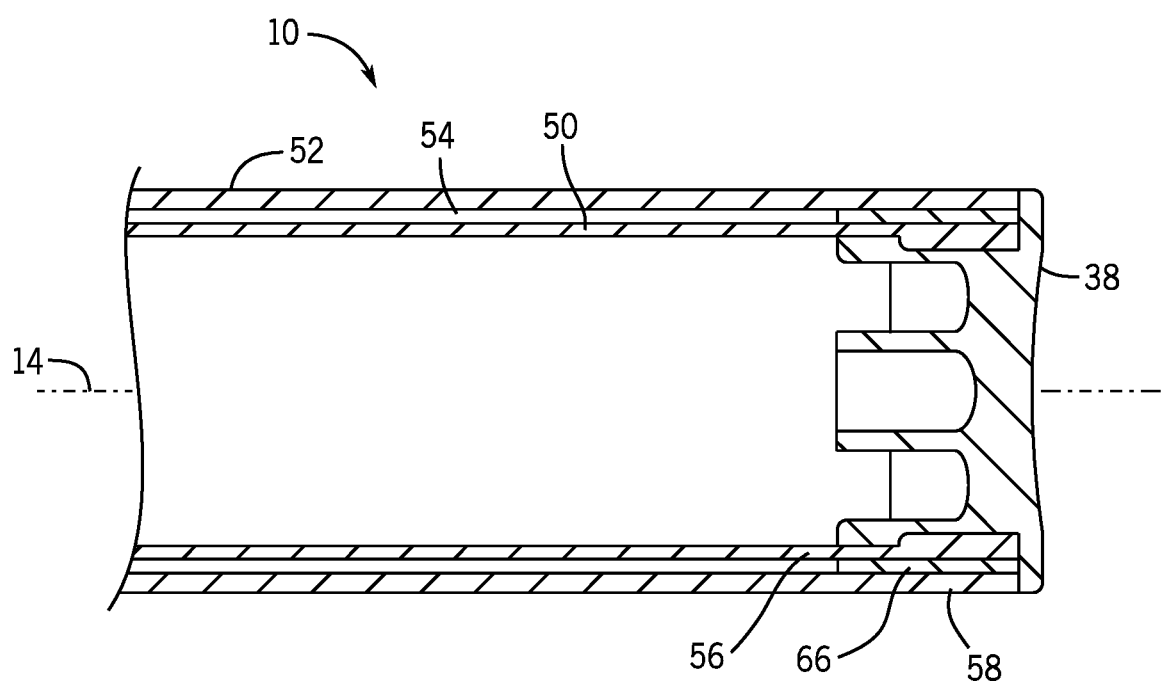
FIG. 6 is a longitudinal sectional view of a distal region of the ball bat of FIG. 1 in accordance with another implementation of the present invention.

Referring to FIG. 6, in another implementation of the present invention, the inner and outer barrel walls 50 and 52 have approximately the same length, and the end cap 38 engages the inner and outer distal region walls 56 and 58 of the inner and outer barrel walls 50 and 52. The distal end of the inner distal region wall 56 can have a thickened region for engaging the end cap 38. In one implementation, the shim 66 can be positioned between the inner and outer distal region walls 56 and 58. In another implementation, the inner and outer distal region walls 56 and 58 can both engage the end cap 38 and the shim 66 can be removed or not used.

Figure 7A:
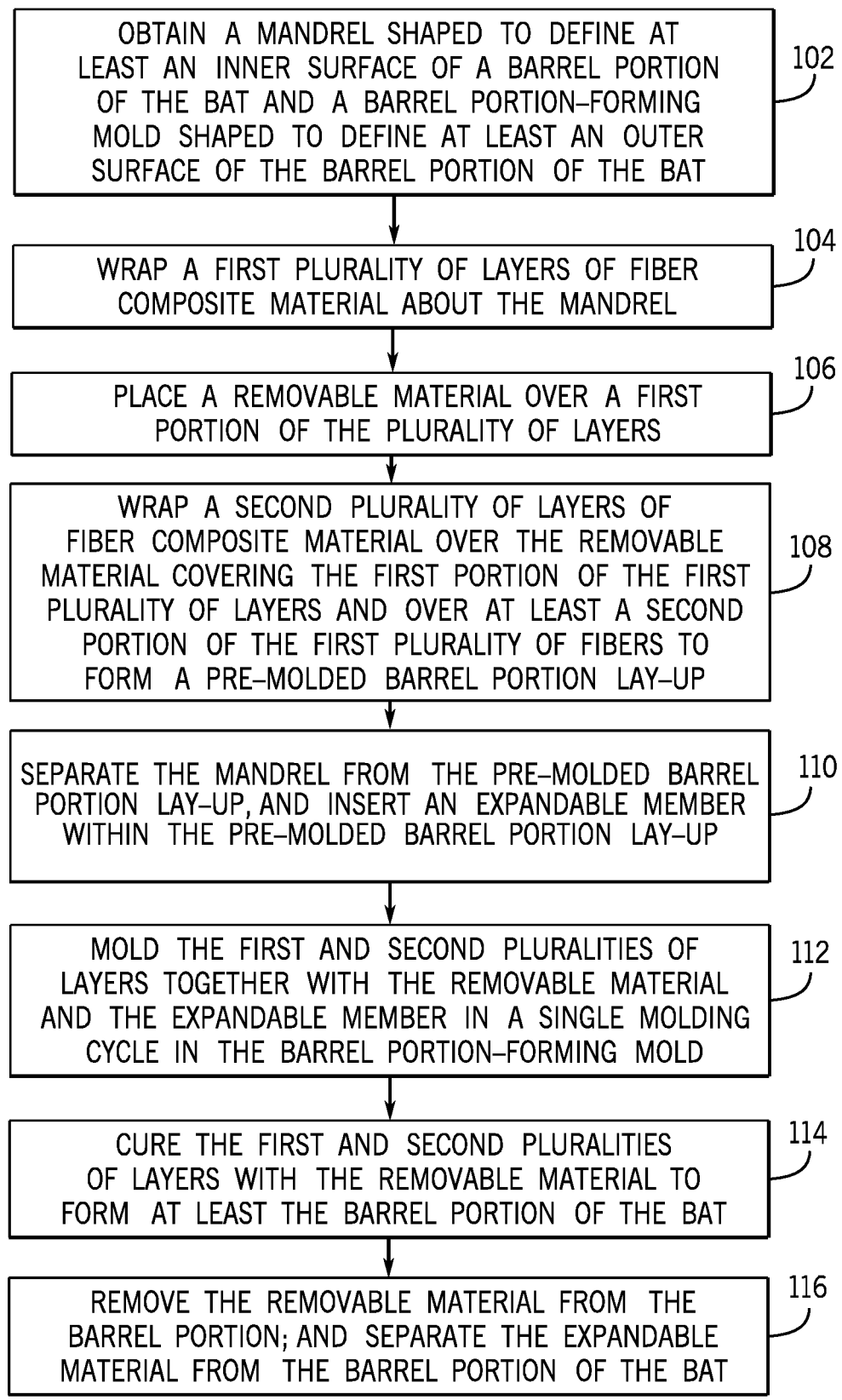
FIG. 7A is a flow diagram of an example method for manufacturing a multi-wall barrel portion of a ball bat using a single molding cycle.

Referring to FIGS. 7A through 12, a method of forming a multi-wall barrel portion 18 of a bat 10 having the outer barrel wall 52 radially spaced apart from at least the first inner barrel wall 50 by the first separation 54 of at least 0.030 inch using a single mold cycle is illustrated. Referring to FIGS. 7A and 8, step 102 provides obtaining a mandrel 80 shaped to define at least an inner surface of the barrel portion 18 of the bat 10. The mandrel 80 extends along the longitudinal axis 14. Step 102 further provides obtaining a barrel portion-forming mold 90 (FIG. 11) shaped to define at least an outer surface of the barrel portion 18 of the bat 10. Step 104 provides wrapping a first plurality of layers or plies 48 of fiber composite material about the mandrel 80. The first plurality of layers 48 of fiber composite material are equivalent to the layers 70. The first plurality of layers 48 are initially uncured (meaning the resin within the layers is uncured). The first plurality of layers wrapped about the mandrel 80 collectively have a first longitudinal dimension, which is equivalent to the barrel portion length $l_b$. Referring to FIG. 8, the first plurality of plies 48 can take different sizes and/or shapes. For example, layers 48a, 48b, 48e and 48g are shown as being sized to extend about the entire circumference and length of the mandrel 80, and thereby would extend over the full length of the barrel portion once molded and cured. In contrast, layers 48c, 48d and 48f are layers 70 that extend over only a portion of the circumference and/or the length of the mandrel 80, and therefore will only extend over a portion of the length of the barrel portion 18 once molded and cured. The layers can take other shapes such as trapezoidal, rectangular, irregular or other shapes. One or more release layers 82 can be incorporated within the first plurality of layers 48. The release layer 82 inhibits the flow of resin between the plies or layers. Once molded and cured, the release layers 82 can provide areas of low shear strength within the lay-up of layers, which can promote independent movement between the layers of fiber composite material. Such independent movement can enhance the performance of the barrel portion 18 upon impact with the ball 44. The release layer 82 can provide a multi-wall effect to a lay-up of fiber composite materials. The separation or separations between the layers of fiber composite material created by the release layer 82 is quite small within the range of 0.0005 to 0.005 inch. The separations created by the release layer 82 are significantly smaller than the first separation 54.

Although FIG. 8 illustrates 7 layers 48 comprising the first plurality of layers 48 and one release layer 82 being layed-up around the mandrel. It is understood that other numbers of layers 48 and release layers 82 could be used (including no release layers). Also, other shapes and sizes of the layers 48 and other fiber angles of the layers can be used. The first plurality of layers 48 of FIG. 8 are used to form the first inner barrel wall 50 and an inner portion of the proximal region 34 of the barrel portion 18.

As the first plurality of layers 48 are wrapped about the mandrel 80, the first plurality of layers 48 are shaped to follow the form or follow the shape of the mandrel 80. Accordingly, the fiber bundles and fibers of the layers 70 of the first plurality of layers 48 also wrap around or follow the shape of the mandrel 80. In this formed position or state, the first plurality of layers 48 are no longer in a flat sheet so the fiber bundles and fibers no longer follow or define generally parallel lines. Rather, the fiber bundles and fibers are adjacent to one another, and are curved or otherwise formed so that they follow substantially the same adjacent paths. For example, as a layer 70 is wrapped about the mandrel, the layer 70 can take a generally cylindrical or tubular shape and the fiber bundles and fibers can follow the same cylindrical path or define a helical path (depending upon their angle within the layer 70). The fibers remain adjacent to one another, are aligned with each other and follow substantially similar paths that are essentially parallel (or even co-axial) for example, when viewed in a sectional view in a single plane or other small finite segment of the layer 70.

Figure 9:
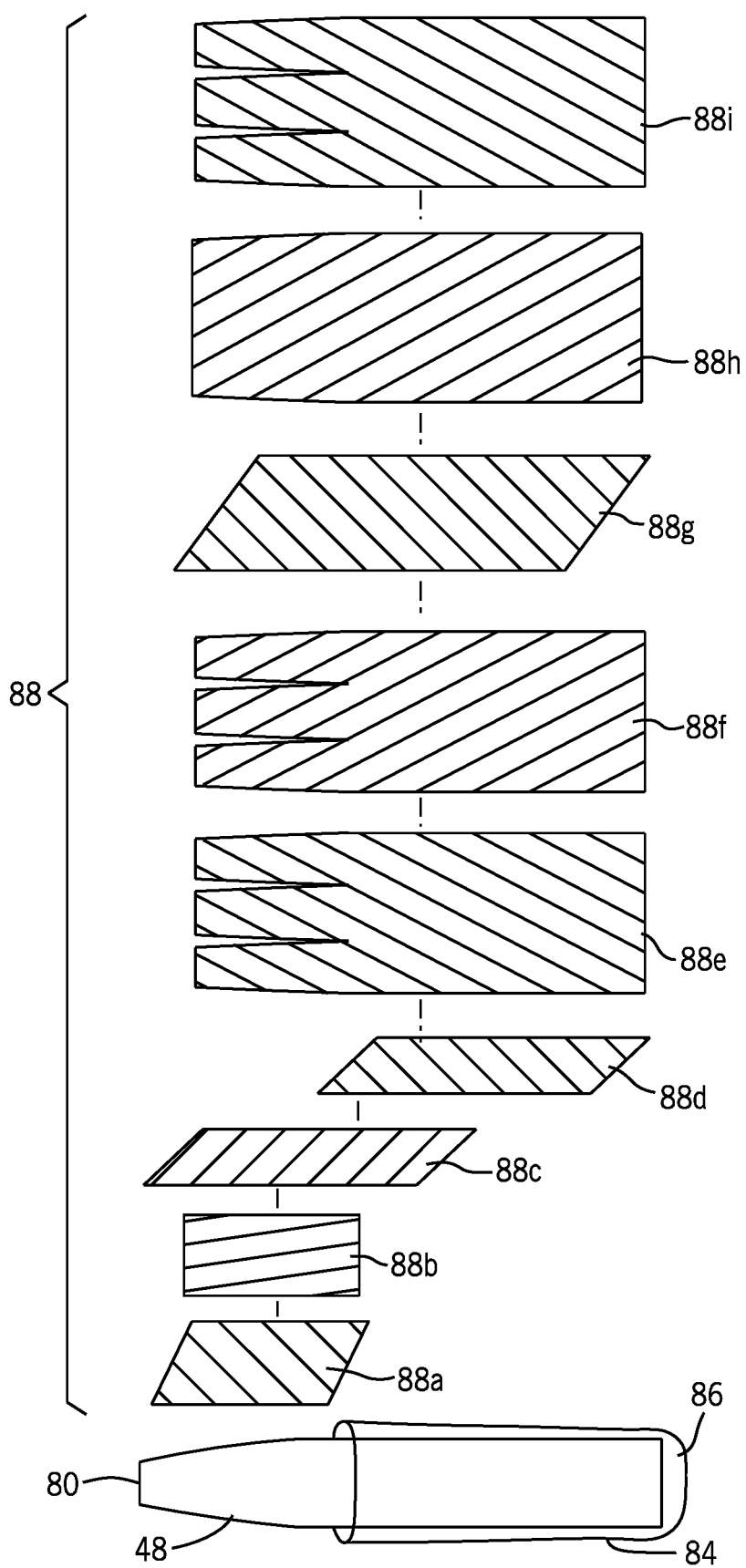

Referring to FIG. 9, step 106 provides for placing a removable material 84 over a first portion of the first plurality of layers 48. The first portion of the first plurality of layers covered by the removable material has a second longitudinal dimension that is less than the first longitudinal dimension. The second longitudinal dimension is equivalent to the outer barrel wall length lo (FIG. 2A). In one implementation, the removable material 84 can have a cylindrical shape that extend around the first portion of the first plurality of layers 48. The removable material 84 can be formed of a Latex, which includes desirable strength, elongation and poisson properties. The removable material 84 has a length that is at least as long as the first portion of the first plurality of layers 48 and is at least as long as the outer barrel wall length lo. In one implementation, the removable material 84 can have a length that is greater the outer barrel wall length lo such that the removable material extends beyond the length of the first plurality of layers 48 and beyond the length of the mandrel 80. The region of the removable material 84 that extends beyond the length of the first plurality of layers 48 is an extended region 86. The extended region 86 facilitates the grasping and removal of the removable material after the barrel portion is formed. In other implementations, the removable material 84 can be one or more generally flat sheets of material that are wrapped about the first portion of the first plurality of layers 48. In other implementations, the removable material can be formed of other materials, such as, for example, silicone, mylar or other polymeric materials (used with one or more release layers, release films, or surface treatments to produce a low-friction, releasing effect), wood, an alloy or combinations thereof. In another implementation, the removable material 84 can be a quantity of wax, a quantity of sand, or combinations thereof.

Step 108 provides wrapping a second plurality of layers 88 of fiber composite material over the removable material 84 covering the first portion of the first plurality of layers 48 and over at least the remaining portion of the first plurality of layers 48. The remaining portion (or second portion) of the first plurality of layers 48 is uncovered by the removable material 84. The second plurality of layers 88 of fiber composite material are equivalent to the layers 70, and are initially uncured (meaning the resin within the layers is uncured). The second plurality of plies 88 can take different sizes and/or shapes. For example, layers 88a through 88e are shown as sized to extend about the entire circumference and length of the mandrel 80 thereby would extend over the first plurality of layers 48 and over the full length of the barrel portion once molded and cured. Like the first plurality of layers 48, the second plurality of layers 88 can include other numbers of layers 70 and also can include layers 70 that have different shapes and/or lengths that do not extend over the entire length and/or circumference of the mandrel 80. The second plurality of layers 88 can also include layers 70 having different fiber angles, and one or more release layers 82 as shown with the first plurality of layers 48. The second plurality of layers 88 are layed-up or otherwise wrapped around and over the first plurality of layers 48 and the removable material 84. The second plurality of layers 88, once molded and cured form the outer barrel wall 52 and the proximal region 34 of the barrel portion 18 along with the first plurality of layers 48. In one example, layers 88a and 88b can be sized to extend over only the second portion of the first plurality of layers 48. Although only two layers 88a and 88b are shown, other numbers of shorter layers can be used to extend over the second portion of the first plurality of layers 48. In one implementation, these shorter layers, such as layers 88a and 88b can approximate the thickness of the removable material 84 positioned over the first portion of the first plurality of layers 48. Layers 88c through 88i illustrate other layers of fiber composite material having different shapes, lengths and fiber angles. These layers 88c through 88i are only representative of one example lay-up, it is contemplated that other numbers of layers can be used, as well as layers having different sizes, shapes, lengths and fiber angles. It is understood that other numbers of layers 88 and no release layer, or one or more release layers 82 could be used. The first plurality of layers 48 and the second plurality of layers 88 along with the removable material 84 form a pre-molded barrel portion lay-up 94. The first and second plurality of layers 48 and 88 are uncured and have yet to be placed within the barrel portion-forming mold 90.

Figure 10:
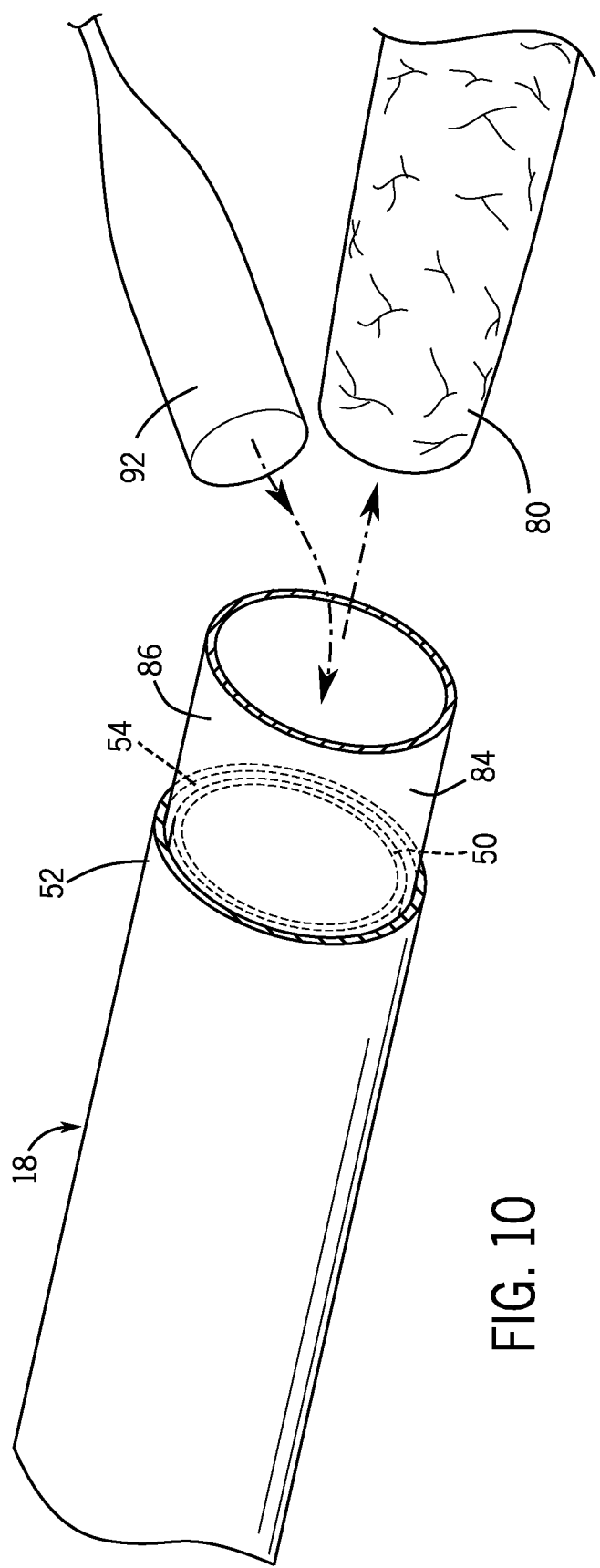

Referring to FIG. 10, step 110 illustrates the mandrel 80 being separated or otherwise removed from the pre-molded barrel portion lay-up 94, and an expandable member 92 is inserted within the pre-molded barrel portion lay-up 94. In one implementation, the expandable member 92 can be an inflatable bladder that, once positioned within the pre-molded barrel portion lay-up 94 and placed within the barrel portion-forming mold 90 can be pressurized with air (or another gas) to apply pressure to the inside of the pre-molded barrel portion lay-up 94 to ensure that the pre-molded barrel portion lay-up 94 takes the shape of the mold 90. In another implementation, the expandable member 92 can be a material configured to expand under heat, such as, for example, silicone or another expandable polymeric material. In other implementations, other expandable materials can be used as the expandable member 92, such as a polymeric foam, elastomers, other high coefficient of thermoexpansion materials, and combinations thereof.

Figure 11:
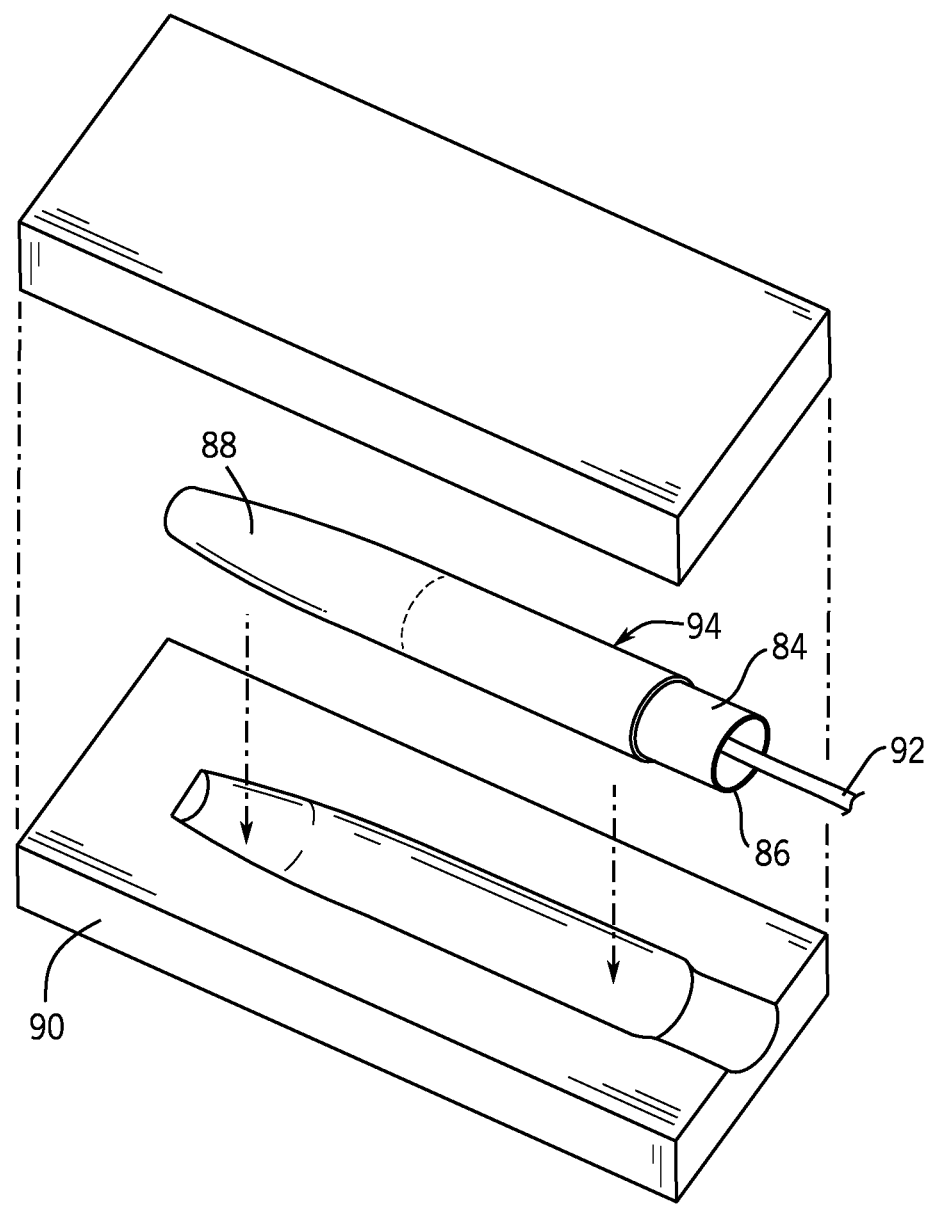

Referring to FIG. 11, step 112 is illustrated, the pre-molded barrel portion lay-up 94 along with the expandable member 92 is positioned within the barrel portion-forming mold 90. When the expandable member 92 is an inflatable bladder, a supply of pressurized air or other gas can be connected to the inflatable bladder 92, the mold 90 is closed and the inflatable bladder 92 is pressurized. Step 112 provides for molding the first and second pluralities of layers together with the removable material in a single molding cycle in the barrel portion-forming mold 90.

The assembly of the first and second plurality of layers 48 and 88 is heated in the barrel portion-forming mold 90. In one implementation, the inflatable bladder 92 is pressurized with air within the range of 30-250 psi, and more preferably approximately 210 psi. The air pressure applied to the bladder 92 can be varied during the single molding cycle. For example, initially the pressure within the bladder can be low (less than 30 psi), and then increased to a higher pressure. The air pressure forces the inflatable bladder 92 to expand and presses the first plurality of layers 48, the removable material 84 and the second plurality of layers 88 against the inner surfaces of the mold 90. The mold 90 heats the assembly or lay-up to the cure temperature of the first and second plurality of layers 48 and 88, preferably within the range of 220 to 380 degrees F. as provided by step 114. The assembly of the first and second pluralities of layers 48 and 88 is molded and cured under heat and/or pressure along with the removable material 84 and the inflatable bladder 92 to produce the barrel portion 18. While curing, the resin is configured to flow and fully disperse and impregnate the matrix of fiber bundles of the layers 70 of the first and second plurality of layers 48 and 88.

Referring to FIG. 12, after curing, the assembly of the first and second plurality of layers 48 and 88, the removable material 84 and the inflatable bladder 92 are removed from the mold 90. Step 114 provides for extracting or removing the removable material 84 from the first and second plurality of layers 48 and 88 which now form the barrel portion 18 and the inflatable tube 94 from the inside of the barrel portion 18. The extended region 86 of the removable material 84 extending beyond the distal end of the barrel portion 18 facilitates the grasping and removal of the removable material 84 from between the first inner barrel wall 50 and the outer barrel wall 52 (formed from the first and second plurality of layers 48 and 88, respectively). The inflatable bladder 92 is also separated from the barrel portion 18. In other implementations, the expandable member 92 may comprise of a material that expands under heat, such as, for example, silicon or another polymeric material. In these implementations, the removable material 92 is removed from the barrel portion 18 after the molding and curing of the barrel portion 18. In other implementations, a quantity of wax and/or a quantity of sand can be used instead of the expandable member.

Figure 7B:
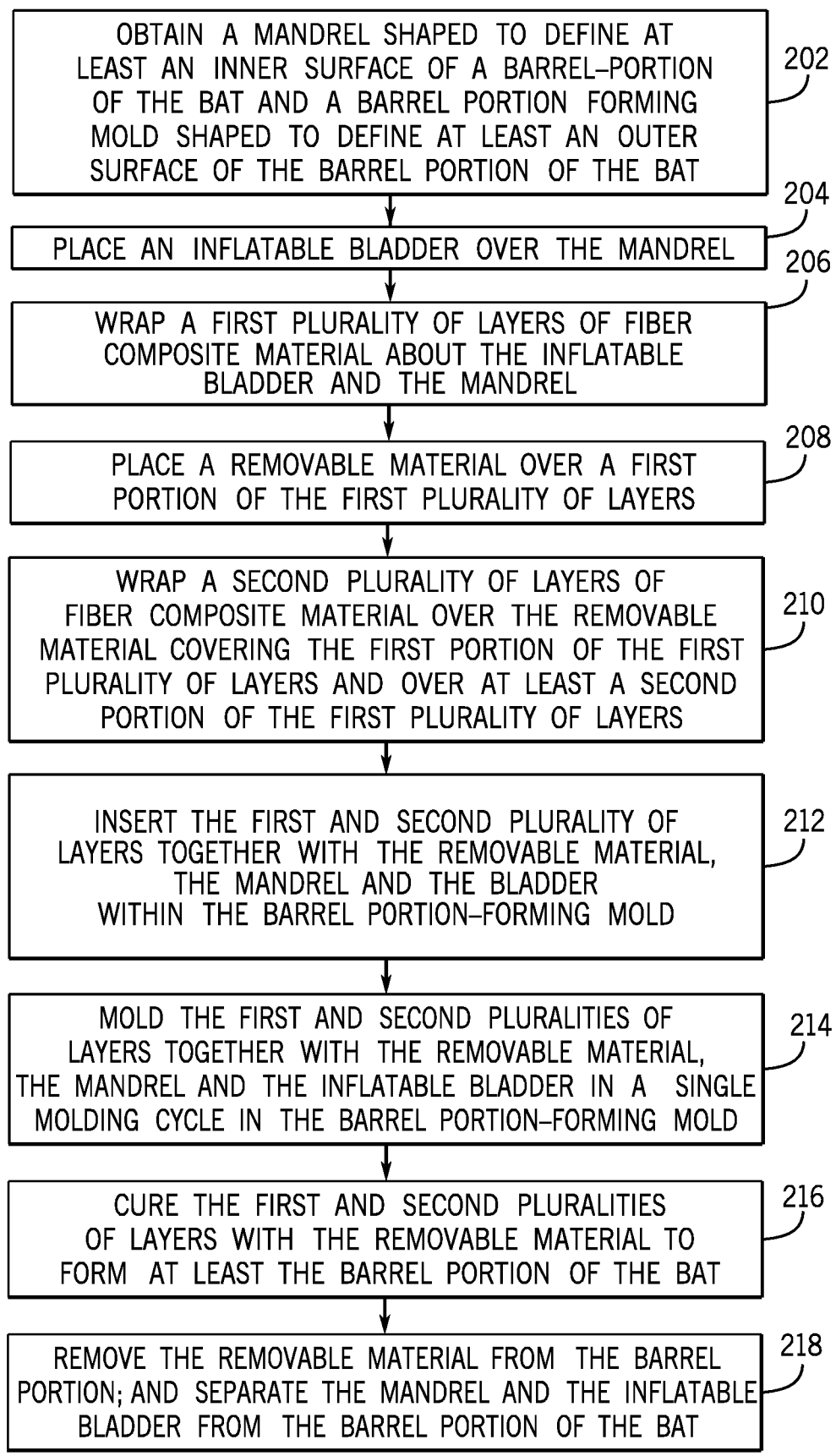
FIG. 7B is a flow diagram of another example method for manufacturing a multi-wall barrel portion of a ball bat using a single molding cycle.
Figure 13:
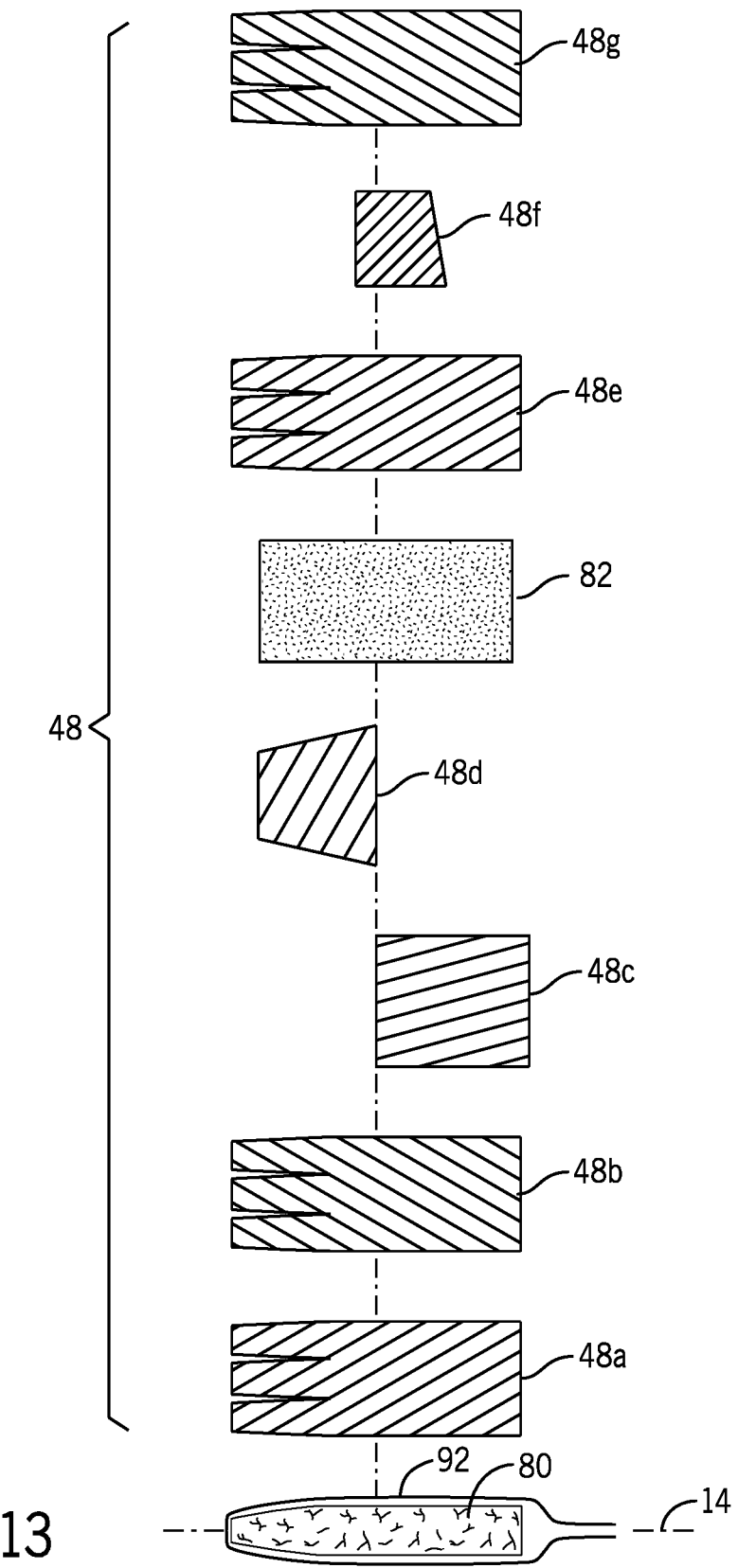
FIG. 13 illustrates another example method of laying up a first plurality of layers of fiber composite material to form a barrel portion of a bat.

Referring to FIG. 7B and FIG. 13, in another implementation, the method of forming the barrel portion 18 in a single mold cycle with radially spaced apart inner and outer barrel walls 50 and 52 can be modified. Step 202 of the method of forming a multi-wall barrel portion formed of fiber composite material in a single mold cycle can include obtaining the mandrel 80. In step 204, the inflatable bladder 92 can be placed over the mandrel 80. In step 206, the first plurality of layers 48 are wrapped about the inflatable bladder 92 and the mandrel 80. In step 208, as illustrated in FIG. 9, the removal material 84 is placed or positioned over the first portion of the first plurality of layers 48. Then, as specified in step 210, the second plurality of layers 88 of fiber composite material can be wrapped over the removable material 84 covering the first portion of the first plurality of layers 48 and over at least the second portion of the first plurality of layers 48.

In step 212, the method includes inserting the first and second plurality of layers 48 and 88 together with the removable material 84, the mandrel 80 and the inflatable bladder 92 within the barrel portion-forming mold 90. Step 212 is essentially illustrated by FIG. 11 except that the mandrel 80 is positioned within the inflatable bladder 92. When the assembly of the first and second plurality of layers 48 and 88 together with the removable material 84, the mandrel 80 and the inflatable bladder 92 is positioned within the mold 90, a supply of pressurized air or other gas can be connected to the inflatable bladder 92, the mold 90 is closed and the inflatable bladder 92 is pressurized. Step 214 provides for molding the first and second pluralities of layers 48 and 88 together with the removable material 84, the bladder 92 and the mandrel 80 in a single molding cycle in the barrel portion-forming mold 90.

The assembly of the first and second plurality of layers 48 and 88 is heated in the barrel portion-forming mold 90. Like steps 112 and 114 described above, the air pressure forces the inflatable bladder 92 to expand and presses the first plurality of layers 48, the removable material 84 and the second plurality of layers 88 against the inner surfaces of the mold 90. The mold 90 heats the assembly or lay-up to the cure temperature of the first and second plurality of layers 48 and 88, preferably within the range of 220 to 380 degrees F. as provided by step 216. The assembly of the first and second pluralities of layers 48 and 88 is molded and cured under heat and/or pressure along with the mandrel 80 and the removable material 84 and the inflatable tube 94 to produce the barrel portion 18. While curing, the resin is configured to flow and fully disperse and impregnate the matrix of fiber bundles of the layers 70 of the first and second plurality of layers 48 and 88.

Referring to step 218, after curing, the assembly of the first and second plurality of layers 48 and 88, the removable material 84, the inflatable bladder 92 and the mandrel 80 are removed from the mold 90. Step 218 provides for extracting or removing the removable material 84 from between the first and second plurality of layers 48 and 88, which now form the barrel portion 18. The extended region 86 of the removable material 84 extending beyond the distal end of the barrel portion 18 facilitates the grasping and removal of the removable material 84 from between the first inner barrel wall 50 and the outer barrel wall 52 (formed from the first and second plurality of layers 48 and 88, respectively). Step 218 also provides removing the inflatable bladder 92 and the mandrel 80 from the inside of the barrel portion 18. FIG. 12 essentially illustrates step 218, except in method of step 218, the mandrel is positioned within the inflatable bladder 92.

In other implementations, the method of FIG. 7B can be modified to not use the inflatable bladder over the mandrel. Instead, pressure can be applied to the outside of the assembly of the first and second plurality of layers 48 and 88, the removable material 84 and the mandrel 80. The pressure on the outside of the assembly could be applied by a heat shrinking material, or the assembly can be placed into an autoclave under an elevated pressure and temperature. A vacuum could also be used in conjunction with the heat shrinking material or the autoclave.

The multi-wall barrel portion 18 produced under either the single mold cycle method of steps 102 through 116 of FIG. 7A, or under the single mold cycle method of steps 202 through 218 of FIG. 7B, has a uniform, integral one-piece structure and the first separation 54 can have a uniform radial dimension between the inner and outer barrel walls 50 and 52 from the proximal region 34 of the barrel portion 18 to the distal end of the barrel portion. The use of the removable material 84 allows for the separation between the inner and outer barrel walls to be better controlled with desirable tight tolerances. This single mold cycle method allows for variation in the gap or separation between the outer diameter of the inner barrel wall and the inner diameter of the outer barrel wall to be eliminated or minimized along the length of the separation. This single mold cycle method simplifies the manufacturing of a multi-wall fiber composite barrel portion by eliminating the need to separately mold and/or separately insert or otherwise attach an insert within the outer wall of the barrel portion. The method of the present invention eliminates the need for a secondary bonding and/or molding operation to assemble a multi-walled barrel portion of a bat. The present single mold cycle method also produced a multi-walled barrel portion that is more reliable and durable than multi-walled barrel bats produced under prior methods. The one-piece, uniform, integral structure of the multi-wall barrel portion of the present invention eliminates weak spots and other undesirable conditions that can result from connecting a conventional insert to an existing barrel portion. The cantilevered first inner barrel wall 50 can be longitudinally spaced apart from the end cap 38 thereby forming a free boundary condition. This one-piece multi-wall structure of the barrel portion 18 with the cantilevered first inner barrel wall 50 having a free boundary condition at its distal end provides improved performance, improved feel and a pleasing sound upon impact with the ball 44. Under prior methods, an inner barrel wall or insert could not be properly securely and reliably held to allow for a proper free boundary condition at the distal end of the inner barrel wall.

Figure 14:
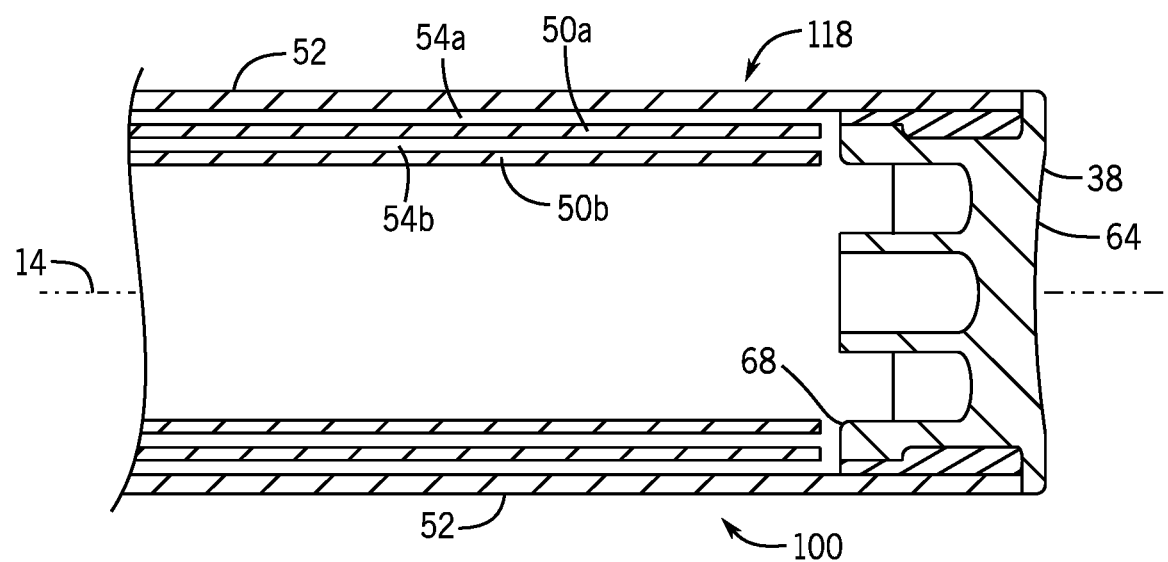
FIG. 14 is a longitudinal sectional view of a distal region of the ball bat of FIG. 1 in accordance with another implementation of the present invention.

Referring to FIG. 14, in another implementation of the present invention is illustrated. FIG. 14 illustrates another implementation of a multi-walled barrel portion 118 of a bat 100. The barrel portion 118 and the bat 100 is substantially similar to the barrel portion 18 and the bat 10 of the prior described implementation, except that the barrel portion 118 includes first and second inner barrel walls 50a and 50b. The second barrel wall 50b is substantially similar to the first inner barrel wall 50a, but is positioned within the first barrel wall 50a. The first inner barrel wall 50a and the outer barrel wall 52 are separated by a first separation 54a and the second inner barrel wall 50b and the first inner barrel wall 50a are separated by a second separation 54b. Like the barrel portion 18, the barrel portion 118 including the proximal region 34, and the first and second inner barrel walls 50a and 50b, and the outer barrel wall 52 is a single continuous integral structure formed of a fiber composite material following a single molding cycle described above. Except the removable material fills the first and second separations 54a and 54b and extends between the first and second inner barrel walls 50a and 50b. In one implementation, the first and second separations 54a and 54b can have substantially uniform radial dimensions, measured radially from the longitudinal axis 14, within the range of 0.010 to 0.150 inch along the first separation length ls. In another implementation, the first and second separations 54a and 54b can have substantially uniform radial dimensions within the range of 0.030 to 0.110 inch along the first separation length ls. In another implementation, the radial dimension of the first and second separations 54a and 54b can vary along the first separation length ls. In one implementation, the first and second inner barrel wall thicknesses of the first and second inner barrel walls 50a and 50b measured radially from the longitudinal axis 14 can each be within the range of 0.030 to 0.150 inch. In one implementation, the outer barrel wall thickness of the outer barrel wall 52 measured radially from the longitudinal axis 14 can be within the range of 0.030 to 0.150 inch.

Figure 15:
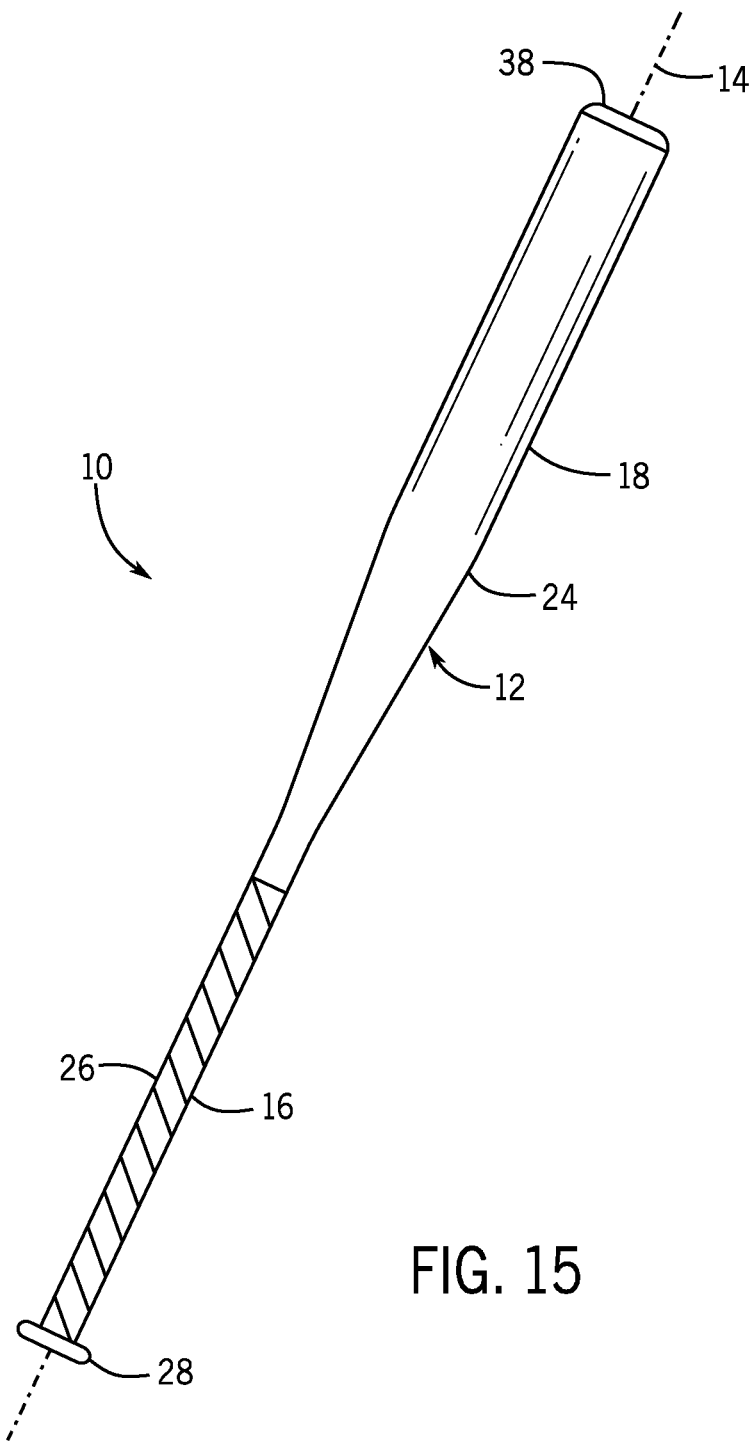
FIG. 15 is a side view of an example ball bat having a one-piece bat frame.

Referring to FIG. 15, in an alternative preferred embodiment, the bat 10 can be formed as a one-piece frame 12 as a one-piece, integral structure. The bat frame 12 includes the handle and barrel portions 16 and 18, but they are formed as single, one-piece body. In other words, the bat frame 12 is not produced as a separate handle and barrel portions that are bonded, molded or otherwise attached together. The use of fiber composite material in the embodiments discussed above for the barrel portion 18 are equally applicable to the one-piece bat frame 12. Similarly, the method of forming a one-piece multi-walled barrel portion as described above are equally applicable to the bat of FIG. 15 having a one-piece frame. The mandrel 80 would have to be longer and narrow on its proximal end to define the inner shape of the handle portion 16 and the tapered region between the handle and barrel portions. Likewise, the mold 90 would also need to be sized and shaped to define the outer shape of the one-piece bat frame 12.

The bat 10 of the present invention provides numerous advantages over existing ball bats. One such advantage is that the bat 10 of the present invention is configured for competitive, organized baseball or softball. For example, embodiments of ball bats built in accordance with the present invention can fully meet the bat standards and/or requirements of one or more of the following baseball and softball organizations: U.S.A. Softball Bat Testing and Certification Program Requirements; United States Specialty Sports Association ("USSSA") Bat Performance Standards including the Bat Performance Factor "BPF" Standard for baseball and softball; World Baseball Softball Confederation ("WBSC") Bat Certification Standards; International Softball Federation ("ISF") Bat Certification Standards; National Softball Association ("NSA") Bat Standards; Independent Softball Association ("ISA") Bat Requirements; Ball Exit Speed Ratio ("BESR") Certification Requirements of the National Federation of State High School Associations ("NFHS"); U.S.A. Baseball Bat Requirements; Little League Baseball Bat Equipment Evaluation Requirements; PONY Baseball/Softball Bat Requirements; Babe Ruth League Baseball Bat Requirements; American Amateur Baseball Congress ("AABC") Baseball Bat Requirements; and, especially, the NCAA BBCOR Standard or Protocol. Accordingly, the term "bat configured for organized, competitive play" refers to a bat that fully meets the ball bat standards and/or requirements of, and is fully functional for play in, one or more of the above listed organizations.

Although the present disclosure has been described with reference to example implementations, workers skilled in the art will recognize that changes may be made in form and detail without departing from the spirit and scope of the claimed subject matter. It is contemplated that one or more features of one or more of the example ball bats described above can be utilized with any of the other examples of ball bats described above. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though may be used conjunction with the description of certain specific embodiments of the present invention.

What is claimed is:

1. A method of forming a ball bat extending along a longitudinal axis and configured for impacting a ball,
    obtaining a mandrel shaped to define at least an inner surface of a barrel portion of the bat, the mandrel extending along the longitudinal axis;
    wrapping a first plurality of layers of fiber composite material about the mandrel, the first plurality of layers of fiber composite material being initially uncured, the first plurality of layers wrapped about the mandrel having a first longitudinal dimension;
    placing a removable material over a first portion of the first plurality of layers, the first portion of the first plurality of layers covered by the removable material having a second longitudinal dimension that is less than the first longitudinal dimension;
    wrapping a second plurality of layers of fiber composite material over the removable material covering the first portion of the first plurality of layers and over at least a second portion of the first plurality of fibers, the second portion of the first plurality of fibers being uncovered by the removable material, the second plurality of layers of fiber composite material being initially uncured, the first and second plurality of layers and the removable material forming a pre-molded barrel portion lay-up;
    separating the mandrel from the pre-molded barrel portion lay-up;
    inserting an expandable member within the pre-molded barrel portion lay-up;
    inserting the pre-molded barrel portion lay-up into a barrel-forming mold, and molding the first and second pluralities of layers together with the removable material in a single molding cycle;
    curing the first and second pluralities of layers with the removable material to form at least the barrel portion of the bat; and
    removing the removable material and the expandable member from the barrel portion, wherein once molded and cured, the first and second pluralities of layers form a proximal region of the barrel portion, wherein the first plurality of layers forms a first inner barrel wall of the barrel portion longitudinally extending from the proximal region, and wherein, once molded and cured, the second plurality of layers forms an outer barrel wall of the barrel portion longitudinally extending from the proximal region, and wherein the length of the first inner barrel wall is shorter than the length of the outer barrel wall.

2. The method of claim 1, wherein the expandable member is an inflatable bladder that is pressurized during the molding of the first and second pluralities of layers together with the removable material.

3. The method of claim 1, wherein the expandable member comprises a material that expands under heat.

4. The method of claim 3, wherein the expandable member is selected from the group consisting of a silicone, a polymeric foam, an elastomer, other high coefficient of thermoexpansion materials, and combinations thereof.

5. The method of claim 1, wherein the removable material is a tube formed of a polymeric material.

6. The method of claim 5, wherein the polymeric material is a latex.

7. The method of claim 1, wherein the removable material is selected from the group consisting of wax, sand, and a silicon with release layers.

8. The method of claim 1, wherein the first inner barrel wall and the outer barrel wall are spaced apart by a first separation.

9. The method of claim 8, wherein the first separation is substantially uniform along the length of the first separation.

10. The method of claim 8, wherein the first separation has a radial dimension between the first inner barrel wall and the outer barrel wall within the range of 0.010 to 0.200 inch.

11. The method of claim 8, wherein the first separation has a radial dimension between the first inner barrel wall and the outer barrel wall within the range of 0.030 to 0.110 inch.

12. The method of claim 1, wherein the first inner barrel wall and the outer barrel wall each have a wall thickness measured radially from the longitudinal axis within the range of 0.030 to 0.200 inch.

13. The method of claim 1, wherein the proximal region, the first inner barrel wall and the outer barrel wall are a single unitary body.

14. The method of claim 1, wherein the length of the first inner barrel wall is 0.2 inch to 4 inches less than the length of the outer barrel wall.

15. The method of claim 1, further comprising the step of coupling an end cap to a distal end of the barrel portion, and wherein the first inner barrel wall is longitudinally spaced apart from the end cap.

16. The method of claim 1, further comprising the step of coupling a handle portion to the proximal end of the barrel portion.

17. The method of claim 1, wherein the proximal region of the barrel portion has a length within the range of 1 inch to 7 inches.

18. The method of claim 8, wherein the first separation is configured to allow for independent movement between the inner barrel wall and the outer barrel wall upon impact with the ball.

19. A method of forming a ball bat extending along a longitudinal axis and configured for impacting a ball,
    obtaining a mandrel shaped to define at least an inner surface of a barrel portion of the bat, the mandrel extending along the longitudinal axis;
    placing an inflatable bladder over the mandrel;
    wrapping a first plurality of layers of fiber composite material about the inflatable bladder and the mandrel, the first plurality of layers of fiber composite material being initially uncured, the first plurality of layers wrapped about the mandrel having a first longitudinal dimension;
    placing a removable material over a first portion of the first plurality of layers, the portion of the first plurality of layers covered by the removable material having a second longitudinal dimension that is less than the first longitudinal dimension;
    wrapping a second plurality of layers of fiber composite material over the removable material covering the first portion of the first plurality of layers and over at least a second portion of the first plurality of fibers, the second portion of the first plurality of fibers being uncovered by the removable material, the second plurality of layers of fiber composite material being initially uncured;
    inserting the first and second pluralities of layers together with the removable material, the mandrel and the inflatable bladder within a barrel portion-forming mold;

pressurizing the inflatable bladder and molding the first and second pluralities of layers together with the removable material in a single molding cycle;
curing the first and second pluralities of layers with the removable material to form at least the barrel portion of the bat;
separating the mandrel and the inflatable bladder from the barrel portion; and
removing the removable material from the barrel portion, wherein once molded and cured, the first and second pluralities of layers form a proximal region of the barrel portion, wherein the first plurality of layers forms a first inner barrel wall of the barrel portion longitudinally extending from the proximal region, and wherein, once molded and cured, the second plurality of layers forms an outer barrel wall of the barrel portion longitudinally extending from the proximal region, and wherein the proximal region is the only point of contact between the first inner barrel wall and the outer barrel wall.

20. A method of forming a ball bat extending along a longitudinal axis and configured for impacting a ball,
obtaining a mandrel shaped to define at least an inner surface of a barrel portion of the bat, the mandrel extending along the longitudinal axis;
wrapping a first plurality of layers of fiber composite material about the mandrel, the first plurality of layers of fiber composite material being initially uncured, the first plurality of layers wrapped about the mandrel having a first longitudinal dimension;
placing a removable material over a first portion of the first plurality of layers, the first portion of the first plurality of layers covered by the removable material having a second longitudinal dimension that is less than the first longitudinal dimension;
wrapping a second plurality of layers of fiber composite material over the removable material covering the first portion of the first plurality of layers and over at least a second portion of the first plurality of fibers, the second portion of the first plurality of fibers being uncovered by the removable material, the second plurality of layers of fiber composite material being initially uncured, the first and second plurality of layers and the removable material forming a pre-molded barrel portion lay-up;
separating the mandrel from the pre-molded barrel portion lay-up;
inserting an expandable member within the pre-molded barrel portion lay-up;
inserting the pre-molded barrel portion lay-up into a barrel-forming mold, and molding the first and second pluralities of layers together with the removable material in a single molding cycle;
curing the first and second pluralities of layers with the removable material to form at least the barrel portion of the bat; and
removing the removable material and the expandable member from the barrel portion, wherein the barrel portion of the bat has a distal end, and wherein, prior to removing the removable material from the barrel portion, the removable material longitudinally extends beyond the distal end of the barrel portion by at least one inch.

21. The method claim 20, wherein the expandable member is an inflatable bladder that is pressurized during the molding of the first and second pluralities of layers together with the removable material.

22. The method of claim 20, wherein the first inner barrel wall and the outer barrel wall are spaced apart by a first separation, wherein the first separation is substantially uniform along the length of the first separation, and wherein the first separation has a radial dimension between the first inner barrel wall and the outer barrel wall within the range of 0.030 to 0.110 inch.

23. A method of forming a ball bat extending along a longitudinal axis and configured for impacting a ball,
obtaining a mandrel shaped to define at least an inner surface of a barrel portion of the bat, the mandrel extending along the longitudinal axis;
placing an inflatable bladder over the mandrel;
wrapping a first plurality of layers of fiber composite material about the inflatable bladder and the mandrel, the first plurality of layers of fiber composite material being initially uncured, the first plurality of layers wrapped about the mandrel having a first longitudinal dimension;
placing a removable material over a first portion of the first plurality of layers, the portion of the first plurality of layers covered by the removable material having a second longitudinal dimension that is less than the first longitudinal dimension;
wrapping a second plurality of layers of fiber composite material over the removable material covering the first portion of the first plurality of layers and over at least a second portion of the first plurality of fibers, the second portion of the first plurality of fibers being uncovered by the removable material, the second plurality of layers of fiber composite material being initially uncured;
inserting the first and second pluralities of layers together with the removable material, the mandrel and the inflatable bladder within a barrel portion-forming mold;
pressurizing the inflatable bladder and molding the first and second pluralities of layers together with the removable material in a single molding cycle;
curing the first and second pluralities of layers with the removable material to form at least the barrel portion of the bat;
separating the mandrel and the inflatable bladder from the barrel portion; and
removing the removable material from the barrel portion, wherein the removable material is a tube formed of a polymeric material, wherein the barrel portion of the bat has a distal end, and wherein, prior to removing the removable material from the barrel portion, the removable material longitudinally extends beyond the distal end of the barrel portion by at least one inch.

24. The method claim 23, wherein the expandable member is an inflatable bladder that is pressurized during the molding of the first and second pluralities of layers together with the removable material.

25. The method of claim 23, wherein the first inner barrel wall and the outer barrel wall are spaced apart by a first separation, wherein the first separation is substantially uniform along the length of the first separation, and wherein the first separation has a radial dimension between the first inner barrel wall and the outer barrel wall within the range of 0.030 to 0.110 inch.

* * * * *